(12) United States Patent
Shechtman et al.

(10) Patent No.: US 9,159,119 B2
(45) Date of Patent: Oct. 13, 2015

(54) METHOD AND SYSTEM FOR SUPER-RESOLUTION SIGNAL RECONSTRUCTION

(75) Inventors: Yoav Shechtman, Haifa (IL); Alexander Szameit, Jena (DE); Mordechai Segev, Haifa (IL); Oren Cohen, Haifa (IL); Yonina Eldar, Haifa (IL); Snir Gazit, Haifa (IL); Pavel Sidorenko, Haifa (IL)

(73) Assignee: TECHNION RESEARCH AND DEVELOPMENT FOUNDATION LTD., Haifa (IL)

( * ) Notice: Subject to any disclaimer, the term of this patent is extended or adjusted under 35 U.S.C. 154(b) by 953 days.

(21) Appl. No.: 13/344,341

(22) Filed: Jan. 5, 2012

(65) Prior Publication Data
US 2012/0188368 A1 Jul. 26, 2012

Related U.S. Application Data

(63) Continuation-in-part of application No. PCT/IL2010/000553, filed on Jul. 8, 2010.

(60) Provisional application No. 61/318,494, filed on Mar. 29, 2010, provisional application No. 61/223,718, filed on Jul. 8, 2009.

(51) Int. Cl.
*H04N 7/18* (2006.01)
*G06F 15/00* (2006.01)
(Continued)

(52) U.S. Cl.
CPC .................... *G06T 3/4053* (2013.01)

(58) Field of Classification Search
CPC .................................................... G06T 3/4053
See application file for complete search history.

(56) References Cited

U.S. PATENT DOCUMENTS

| 7,511,643 B2 | 3/2009 | Baraniuk et al. |
| 7,646,924 B2 | 1/2010 | Donoho |

(Continued)

FOREIGN PATENT DOCUMENTS

| WO | WO 2007/050680 A2 | 5/2007 |
| WO | WO 2008/063691 A2 | 5/2008 |

OTHER PUBLICATIONS

Yang et al., "Image Super-Resolution as Sparse Representation of Raw Image Patches," IEEE Computer Society Conference on Computer Vision and Pattern Recognition, 2008.*

(Continued)

*Primary Examiner* — Andy Rao
*Assistant Examiner* — Tyler Edwards
(74) *Attorney, Agent, or Firm* — Oliff PLC

(57) ABSTRACT

A method and system are presented for reconstructing an input field where the latter is sensed by a measurement system. The method comprises: providing measured data corresponding to output field of said measurement system; providing data about sparsity of the input field, and data about effective response function of the measurement system; and processing the measured data based on said known data, the processing comprising: determining a sparse vector as a function of said measured data, said data about the sparsity of the input field, and said data about the effective response function; and using the sparse vector for reconstructing the input information. The invention allows for sub-wavelength resolution in imaging applications, and allows for detection of very short pulses by slow detectors in some other applications.

55 Claims, 24 Drawing Sheets

(51) Int. Cl.
| | |
|---|---|
| *G06K 9/46* | (2006.01) |
| *G06K 9/00* | (2006.01) |
| *G06K 9/36* | (2006.01) |
| *G06T 3/40* | (2006.01) |

(56) References Cited

U.S. PATENT DOCUMENTS

| | | |
|---|---|---|
| 2008/0260279 A1 | 10/2008 | Volovelsky et al. |
| 2009/0141995 A1 | 6/2009 | Chakraborty et al. |
| 2010/0001901 A1 | 1/2010 | Baraniuk et al. |

OTHER PUBLICATIONS

Gazit et al. —"Super-resolution and reconstruction of sparse sub-wavelength images" Optics Express, vol. 17, No. 26, Dec. 21, 2009, pp. 23920-23946.*

Huang et al., "Super-Resolution without Evanescent Waves," *Nano Letters*, vol. 9, No. 3, 2009, pp. 1249-1254.

Yildiz et al., "Myosin V Walks Hand-Over-Hand: Single Fluorophore Imaging with 1.5-nm Localization," *Science*, vol. 300, Jun. 27, 2003, pp. 2061-2065.

Hell at al., "Diffraction-unlimited three-dimensional optical nanoscopy with opposing lenses," *Nature Photonics*, vol. 3, Jul. 2009, pp. 381-387.

Pendry, "Negative Refraction Makes a Perfect Lens," *Physical Review Letters*, vol. 85, No. 18, Oct. 30, 2000, pp. 3966-3969.

Fang et al., "Sub—Diffraction-Limited Optical Imaging with a Silver Superlens," *Science*, vol. 308, Apr. 22, 2005, pp. 534-537.

Salandrino et al., "Far-field subdiffraction optical microscopy using metamaterial crystals: Theory and simulations," *Physical Review B*, vol. 74, Issue 7, Aug. 2006, pp. 075103-1 through 075103-5.

Liu et al., "Far-Field Optical Hyperlens Magnifying Sub-Diffraction-Limited Objects," *Science*, vol. 315, Mar. 23, 2007, p. 1686.

Candes et al., "Robust Uncertainty Principles: Exact Signal Reconstruction from Highly Incomplete Frequency Information," *IEEE Transactions on Information Theory*, vol. 52, 2005, pp. 1-41.

Candes et al., "Near Optimal Signal Recovery From Random Projections: Universal Encoding Strategies?" *IEEE Transactions on Information Theory*, vol. 52, 2006, pp. 1-39.

Tropp, "Greed is Good: Algorithmic Results for Sparse Approximation," *IEEE Transactions on Information Theory*, vol. 50, No. 10, Oct. 2004, pp. 2231-2242.

Chen et al., "Atomic Decomposition by Basis Pursuit," *SIAM Review*, vol. 43, No. 1, 2001, pp. 129-159.

Goodman, *Introduction to Fourier Optics*, McGraw-Hill Companies, Inc., $2^{nd}$ Edition, 1996, pp. 132-134.

Gazit et al., "Super-resolution and reconstruction of sparse sub-wavelength images," *Optics Express*, vol. 17, No. 26, Dec. 21, 2009, pp. 23920-23946.

Donoho et al., "Stable Recovery of Sparse Overcomplete Representations in the Presence of Noise," *IEEE Transactions on Information Theory*, vol. 52, No. 1, Jan. 2006, pp. 6-18.

Donoho, "Compressed Sensing," *IEEE Transactions on Information Theory*, vol. 52, No. 4, Apr. 2006, pp. 1289-1306.

Hunt, "Super-Resolution of Images: Algorithms, Principles, Performance," *International Journal of Imaging Systems and Technology*, vol. 6, 1995, pp. 297-304.

\* cited by examiner

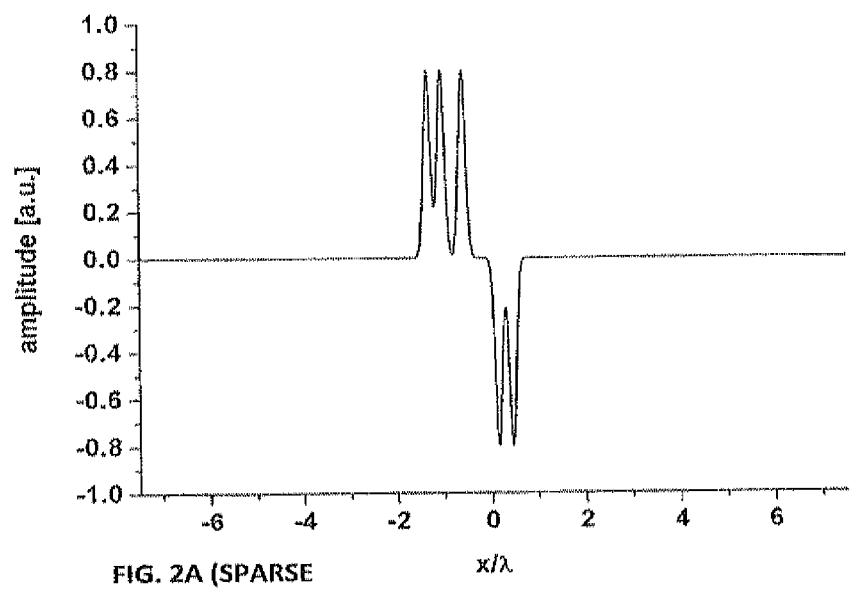
FIG. 2A (SPARSE INPUT FIELD)
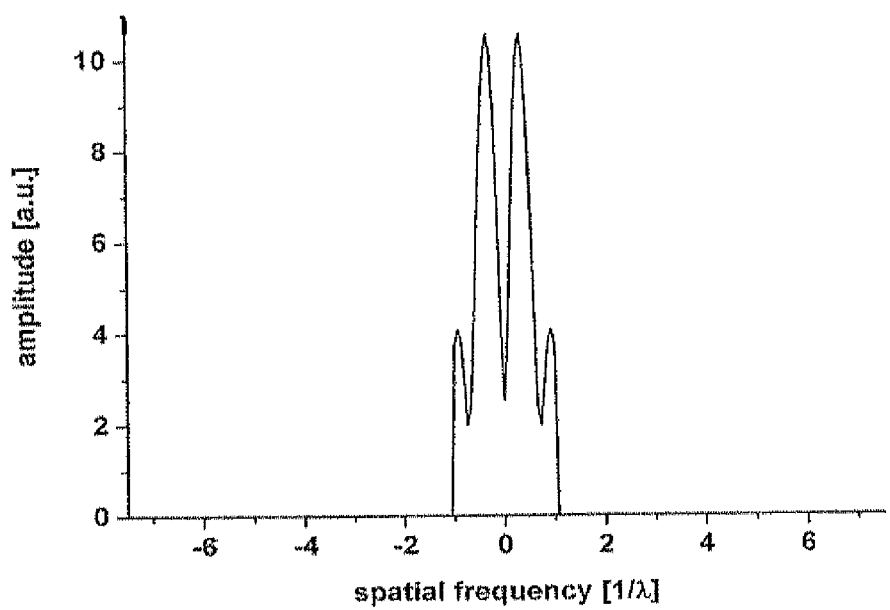
FIG. 2B (MEASURED OUTPUT FIELD)

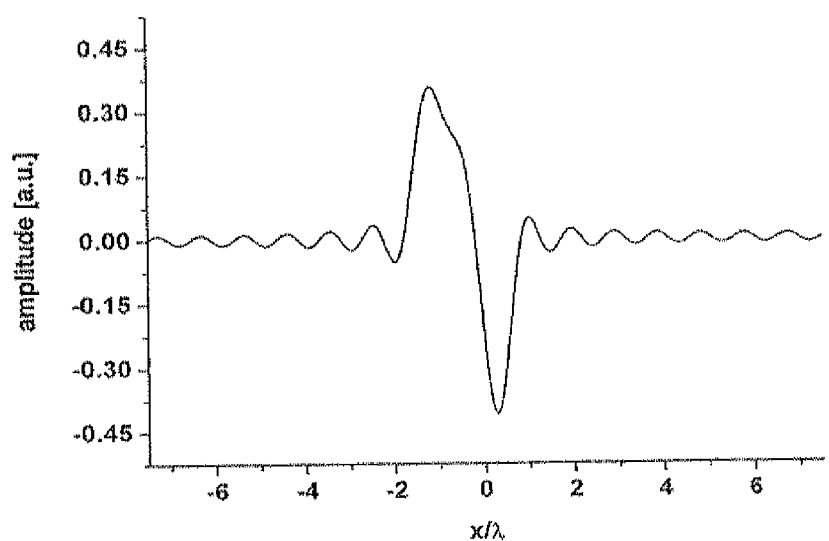
FIG. 2C (CONVENTIONAL RECONSTRUCTION)

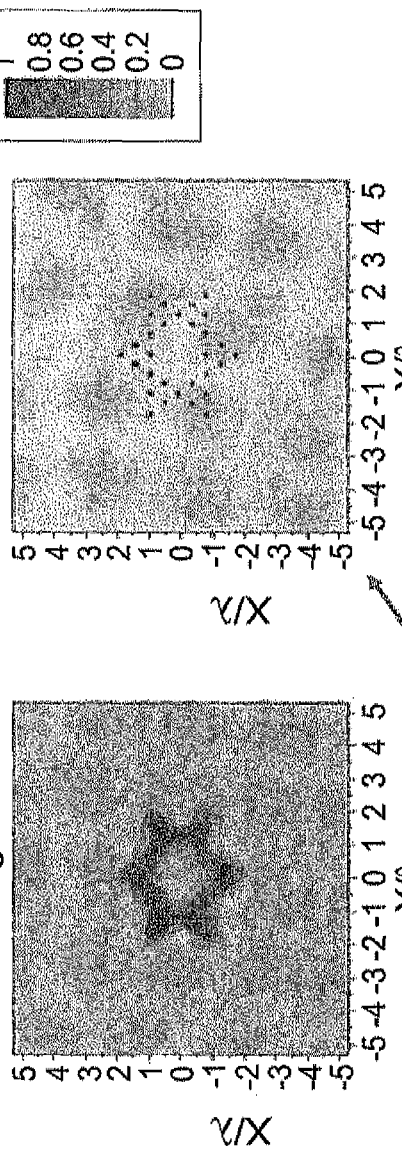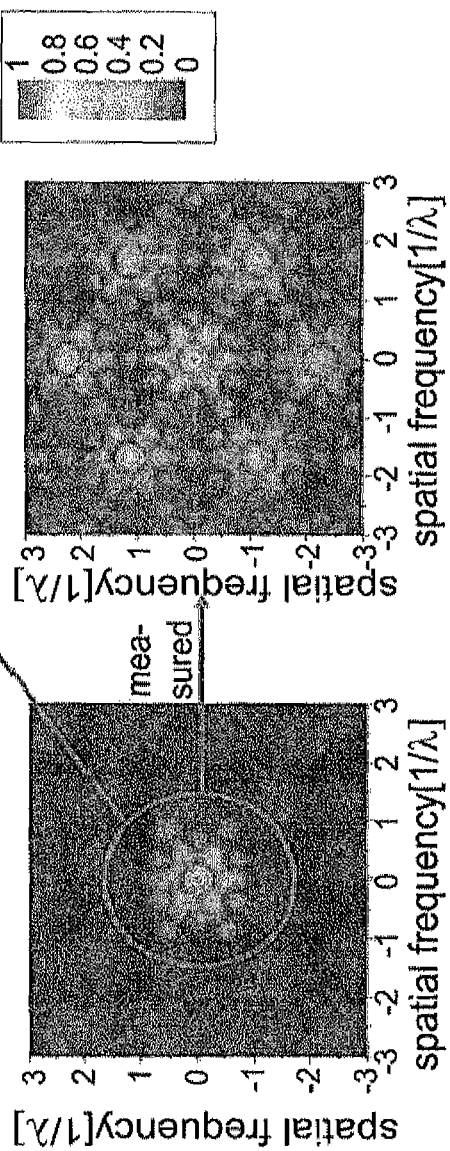
FIG. 8A FIG. 8C FIG. 8E
FIG. 8B FIG. 8D FIG. 8F

METHOD AND SYSTEM FOR SUPER-RESOLUTION SIGNAL RECONSTRUCTION

FIELD OF THE INVENTION

This invention is generally in the field of signal reconstruction techniques, and relates to a method and system for bandwidth extrapolation and super-resolution signal reconstruction. The invention can be implemented in signal measurement systems where signals, in particular in optical imaging systems, short pulse detection systems, etc.

REFERENCES

The following is a list of references relevant for the understanding of the background of the invention:

[1] F. M. Huang and N. I. Zheludev, "Super-resolution without evanescent waves," Nano Lett. 9, 1249-1254 (2009).
[2] A. Yildiz, J. N. Forkey, S. A. McKinney, T. Ha, Y. E. Goldman, and P. R. Selvin, "Myosin v walks hand-over-hand: Single fluorophore imaging with 1.5 nm localization," *Science* 300, 2061-2065 (2003).
[3] S. W. Hell, R. Schmidt, and A. Egner, "Diffraction-unlimited three-dimensional optical nanoscopy with opposing lenses," Nat. Photon. 3, 381-387 (2009).
[4] J. B. Pendry, "Negative refraction makes a perfect lens," *Phys. Rev. Lett.* 85, 3966-3969 (2000).
[5] N. Fang, H. Lee, C. Sun, and X. Zhang, "Sub-diffraction-limited optical imaging with a silver superlens," *Science* 308, 534-537 (2005).
[6] A. Salandrino and N. Engheta, "Far-field subdiffraction optical microscopy using metamaterial crystals: Theory and simulations," *Phys. Rev. B* 74, 075103 (2006).
[7] Z. Liu, H. Lee, Y. Xiang, C. Sun, and X. Zhang, "Far-field optical hyperlens magnifying sub-diffraction-limited objects," *Science* 315, 1686 (2007).
[8] E. J. Candes, J. Romberg, and T. Tao, "Robust uncertainty principles: exact signal reconstruction from highly incomplete frequency information," *IEEE Trans. Inf. Theory* 52, 489-509 (2006).
[9] E. J. Candes and T. Tao, "Near-optimal signal recovery from random projections: Universal encoding strategies?" *IEEE Trans. Inf. Theory* 52, 5406-5425 (2006).
[10] D. L. Donoho, "Compressed sensing," *IEEE Trans. Inf. Theory* 52, 1289-1306 (2006).
[11] J. A. Tropp, *IEEE Trans Inf. Theory* 50, 2231-2242 (2004)
[12] D. L. Donoho, M. Elad, and V. M. Temlyakov, *IEEE Trans. Inf. Theory* 52, 6-18 (2006).
[13] S. S. Chen, D. L. Donoho, and M. A. Saunders, "Atomic decomposition by basis pursuit," *SIAM J. Sci. Comput.* 20, 33-61 (1998).
[14] J. W. Goodman, *Introduction to Fourier optics* (McGraw-Hill Comp., 1996), 2nd ed. Pages 132-134.
[15] S. Gazit, A. Szameit, Y. C. Eldar, and M. Segev, *Opt. Exp.* 17, 23920 (2009).

BACKGROUND

It is a common goal of various measurement systems to enhance the resolution of measured data. Such measurement systems include for example optical imaging systems, where the resolution is generally limited by diffraction limit, i.e. defining the smallest resolvable feature in optical imaging of the specific imaging system, which is determined mainly by the numerical aperture of optical components (lenses, etc.) involved. However, even a system with an infinite aperture has a resolution limit, which arises from the wavelength $\lambda$ of an electromagnetic (EM) field. Therefore, the best recoverable resolution of the optical system is $\lambda/2$ regardless. This is because the propagation of EM waves in bulk media acts as a low-pass filter, for distances much larger than the wavelength, rendering spatial frequencies larger than $1/\lambda$ evanescent. Therefore, such spatial frequencies decay rapidly, on a distance scale of several wavelengths, and the observation of sub-wavelength features is essentially impossible using conventional imaging methods.

Over the years, there have been many attempts to bypass the $\lambda/2$ limit on optical imaging. Many of these attempts focused on measurements at a very close proximity ("near field") to the sub-wavelength specimen. One such approach is the Near-field Scanning Optical Microscope (NSOM or SNOM). This technique is based on a very narrow tip, which samples the electromagnetic field point by point at the near field of the sub-wavelength specimen. However, this technique always requires scanning the sample point-by-point, at very high precision (nanometers) and at a very short distance from the sample (sub-microns). Hence, NSOM cannot capture a full image in real time. Other known approaches are based on probing the information with sub-wavelength holes made from thin film of plasmonic metals, and scanning the sample, or using specific arrangements of nano-hole arrays in plasmonic metals to construct super-oscillatory wavepackets in the form of sub-wavelength hot-spots, and then scan the sample at sub-wavelength resolution [1]. Both of these methods rely on scanning, hence cannot yield real-time imaging either. Other techniques for sub-wavelength imaging rely on distributing smaller-than-wavelength fluorescing items on the object and repeating the experiments multiple times [2,3]. All of these techniques suffer from such disadvantages as long scanning, or imaging time involved in scanning, or a need for repeating the experiments, rendering real-time imaging impractical.

Yet another method involves imaging devices (superlens, hyperlens, etc.) made of negative-index materials [4-7]. However, optical negative index materials suffer from huge losses, and in addition the hyperlens can deal only with one-dimensional information, not with full 2D images. Hence, negative-index materials currently do not offer viable technology for sub-wavelength optical imaging.

There have been attempts to achieve sub-wavelength imaging using algorithmic techniques (processing image data). These techniques rely on the analyticity of an EM field: if an analytic function is known exactly at some finite region, it can be completely recovered and uniquely found by analytic continuation. Several concepts and extrapolation methods based on the analytic theory have been developed. However, these methods are extremely sensitive to noise in the measured data and to the assumptions made on the information to be images (signal to be recovered).

Some examples of resolution enhancement techniques are described in US 2008/0260279 providing a method for iterative derivation of a master image from sampled images of non-identical, at least partially overlapping, regions of a scene. The method includes defining a transformation operator mapping positions within the master image to corresponding positions in the sampled image; a distortion operator simulating a modulation transfer function associated with an imaging sensor from which the sampled image was generated; and a sampling operator for reducing an image from the output resolution to the resolution of the sampled image. For each sampled image the transformation operator, distortion operator and sampling operator are applied to a current master image hypothesis to generate a predicted image A difference image is calculated which has pixel values corresponding to the difference in corresponding pixel values between the sampled image and the predicted image. A back-projection of each of the difference images is performed to generate a correction image for the current master image hypothesis. Finally, the correction images are employed to perform a correction to the current master image hypothesis to generate a new master image hypothesis. The correction to the current master image hypothesis includes combining the correction images by deriving a weighted average of values of corresponding pixels in the correction images. The weight of each pixel in each correction image is calculated as a function of a distance as measured in the sampled image between: a point in the sampled image to which the pixel in the correction image is mapped by the transformation operator, and at least one pixel centroid proximal to that point.

Pulse-shape measurement of a short pulse (optical or electronic) signal is another significant example where resolution enhancement of the measurement systems is of much interest. In optics, short laser pulses with durations in the range of nano second to picosecond and femtosecond time-scales are produced regularly. Ultra-short pulses in the attosecond time-scale have been recently produced. In many systems or applications where short pulses are engaged, it is very important to characterize the shape of the pulse (intensity only or amplitude and phase) at high resolution. There are several devices and techniques to measure the pulse-shape of a short laser pulse. For example, high-speed photodiodes or streak camera in conjunction with oscilloscopes are widely used for direct measurements of the pulse-shape (intensity profile) of laser pulses at nanosecond to picosecond temporal resolution because of their simplicity, robustness, relative insensitiveness to the light properties, small size, and low-cost. Several techniques for measuring the pulse-shape of short pulses make use of nonlinear interaction between the pulse and a another pulse with a known pulse-shape (e.g. cross correlation, or cross-correlation frequency resolved optical gating) or with a time-delayed replica of the measured pulse (e.g. autocorrelation, frequency resolved optical gating (FROG), and SPectral Interferometry for Direct E-field Reconstruction which is termed SPIDER).

In a different area of information processing, the past decades have witnessed major breakthroughs in data compression and advances in sampling techniques. Most notably, a new technique was developed in 2006, with the purpose of reducing the sampling rate of information. The technique is called compressed sensing (CS) and it is now widely used for sub-Nyquist sampling of data, and recovering data from a small number of samplings. In doing that, the technique mostly relates to interpolation of information from sub-sampled data, and relies on a single requirement for prior information that the signal (to be recovered) is sparse in a known basis [8-10]. Currently, there are two main mindsets in the field of CS, both mindsets trying to reconstruct a function by a few measurements. The first approach in the CS tries to reconstruct a sparse function by measuring randomly in the Fourier domain of the function. These randomly distributed measurements are aimed at reconstructing the entire function, provided the function is sparse. The second CS approach is aimed at enhancing the resolution of a known low-resolution image. This second technique is based on measurements in the same domain as the original image, and requires that information is retrieved from several defined examples in order to calibrate the algorithm for resolution enhancement. This method can, for example, produce a 200×200 pixels image from an original image with resolution of 20×20 pixels, but still cannot add data which was not in the original image.

Some examples of using the CS technique in signal processing are described in the following patent publications:

U.S. Pat. No. 7,646,924 provides a method and apparatus for compressed sensing yields acceptable quality reconstructions of an object from reduced numbers of measurements. A component x of a signal or image is represented as a vector having m entries. Measurements y, comprising a vector with n entries, where n is less than m, are made. An approximate reconstruction of the m-vector x is made from y. Special measurement matrices allow measurements y=Ax+z, where y is the measured m-vector, x the desired n-vector and z an m-vector representing noise. "A" is an n by m matrix, i.e. an array with fewer rows than columns. "A" enables delivery of an approximate reconstruction, $x^\#$, of x. An embodiment discloses approximate reconstruction of x from the reduced-dimensionality measurement y. Given y, and the matrix A, $x^\#$ of x is possible. This embodiment is driven by the goal of promoting the approximate sparsity of $x^\#$.

U.S. Pat. No. 7,511,643 describes a method for approximating a plurality of digital signals or images using compressed sensing. In a scheme where a common component $x_c$ of said plurality of digital signals or images an innovative component $x_i$ of each of said plurality of digital signals each are represented as a vector with m entries, the method comprises the steps of making a measurement $y_c$, where $y_c$ comprises a vector with only $n_i$ entries, where $n_i$ is less than m, making a measurement $y_i$ for each of said correlated digital signals, where $y_i$ comprises a vector with only $n_i$ entries, where $n_i$ is less than m, and from each said innovation components $y_i$, producing an approximate reconstruction of each m-vector $x_i$ using said common component $y_c$ and said innovative component $y_i$.

US 2009/141995 provides a method of compressed sensing imaging includes acquiring a sparse digital image b, said image comprising a plurality of intensities corresponding to an I-dimensional grid of points, initializing points ($x^{(k)}$, $y^{(k)}$), wherein $x^{(k)}$ is an element of a first expanded image x defined by $b=R\Phi^{-1}x$, wherein R is a Fourier transform matrix, $\Phi$ is a wavelet transform matrix, $y^{(k)}$ is a point in $\partial(\Sigma_{i=1}^{1}\nabla_{j}\Phi^{-1}x^{(k)})^{2})^{1/2}$, $\nabla_i$ is a forward finite difference operator for a $i^{th}$ coordinate, and k is an iteration counter; calculating a first auxiliary variable $s^{(k)}$ from $x^{(k)}-\tau_1(\alpha\Phi\Sigma_n L_n^* y_n^{(k)}+\Phi R^*(R\Phi^{-1}x^{(k)}-b))$, wherein $\tau_1,\alpha$ are predetermined positive scalar constants, the sum is over all points n in x, and L* is an adjoint of operator $L=(\nabla_1, \ldots, \nabla_1)$; calculating a second auxiliary variable $t_n^{(k)}$ from $y_n^{(k)}+\tau_2 L_n\Phi^{-1}x^{(k)}$, wherein $\tau_2$ is a predetermined positive scalar constant; updating $x^{(k+1)}$ from sign $(s^{(k)})$max $\{0,|s^{(k)}|-\tau^1\beta\}$, wherein $\beta$ is a predetermined positive scalar constant; and updating $y_n^{(k+1)}$ from min $\{1/\tau_2, \|t_n^{(k)}\|_2\}t_n^{(k)}/\|t_n^{(k)}\|_2$.

US 2010/0001901 provides for method and apparatus for developing radar scene and target profiles based on Compressive Sensing concept. An outgoing radar waveform is transmitted in the direction of a radar target and the radar reflectivity profile is recovered from the received radar wave sequence using a compressible or sparse representation of the radar reflectivity profile in combination with knowledge of the outgoing wave form. In an exemplary embodiment the outgoing waveform is a pseudo noise sequence or a linear FM waveform.

Also, the compressed sensing technique is described in "Image Super-Resolution as Sparse Representation of Raw Image Patches", Jianchao Yang, John Wright, Thomas Huang, Yi Ma., IEEE Computer Society Conference on Computer Vision and Pattern Recognition (CVPR), 2008.

General Description

There is a need in the art in facilitating resolution enhancement of measurements of signals of various types (e.g. optical, electronic), such as to be beyond a so-called "physical resolution" of measurements. Such physical resolution limitation is typically defined by the response function of a measurement unit (sensor) or a measurement technique (e.g. cross-correlation of measured data with a known reference data).

The resolution with which a signal is collected and detected (measured) in a measurement unit is limited by three main parameters. The first parameter is associated with the sampling of a measurement procedure, such as the sampling rate of a detector, such as spatial resolution of an optical sensor (pixel size in a camera) used for capturing an image, or the temporal sampling rate of detector (e.g. oscilloscope), or the retardation step of an interferometer (or spectrometer). The second parameter is the effective response function of the measurement unit, corresponding to either spatial or temporal frequency response. In this connection, it should be understood that in systems which are linear and shift invariant (e.g. utilizing coherent or completely incoherent illumination) such effective response function is actually represented by a frequency response function itself, while for other system (e.g. non-linear and/or shift variant, e.g. utilizing partially incoherent illumination) the effective response function is determined by a relation between the input signal and the output signal (measured by said measurement system). For example, for measurements of an input field in the form of partially-spatially-incoherent light, there is actually no transfer function, because the operation is not linear and not shift-invariant. Thus, in the present application, the term "frequency response function" or "transfer function" or "spectral response function" should be interpreted broadly meaning the effective response function which in some cases is expressed by a relation between the input and output fields/signals/data. The third parameter is the signal to noise ratio of the measurements.

The inventors have found a technique to restore, from the sensed (measured) data, those features of the input information (input signal) that were lost in the sensed data due to the physical resolution limitation, and cannot be retrieved by just normalizing the measured data by the frequency transfer function of the measurement unit. In other words, the invented technique enables to overcome the limitation associated with the highest frequency in the measured data, at which the signal to noise ratio allows reconstruction through de-convolution (division of the measured data by the spectral transfer function of the measurement system).

The response function of the measurement system and the signal to noise ratio of measurements by said system are the main factors that define and limit the resolution at which the signal is measured. Most often, a spectral response function, $g(\omega)$, acts as a low pass filter (LPF) with a characteristic cutoff-frequency $f_c$ (where in the time-domain $f_c \sim 1/t_c$, $t_c$ being the rise-time of the detector). If the input data (signal or field) contains features at frequencies higher than the cutoff-frequency, then the sensor output signal (measured data) deviates from the input data. In this case, de-convolution methods are often used for extracting the input data. De-convolution methods consist of reversing the detector spectral filtering operation, where the latter is convolution of the input signal with the spectral transfer function of the detector (frequency filtering). De-convolution is achieved by re-amplifying the detector output signal (in the spectral domain) by a factor that corresponds to the inverse of the spectral transfer function of the detector $(1/|g(\omega)|)$. This amplification factor becomes very large at high-frequency spectral regions $(|g(\omega)|<<1)$. Hence, tiny errors in these spectral regions are very unforgiving because they are amplified by a very large factor, i.e. low noise in such frequencies is amplified (as well as the signal) thus reducing signal to noise ratio (SNR). In fact, de-convolution processes cannot recover information from spectral regions in which $SNR(\omega)<1/|g(\omega)|$.

Often, the response function of the system contains a genuine cutoff frequency, above which the transfer function is zero (or corresponds to very large attenuation). The amplitudes of frequencies higher than the cutoff frequency are greatly attenuated, such that these high-frequency signals are below the noise level and cannot be extracted (separated from the noise). Such high frequency information is therefore considered as lost. Thus, it is commonly believed that information in these high frequency spectral regions is lost and cannot be recovered. The frequency at which $SNR(\omega)<1/|g(\omega)|$ actually presents the effective cutoff frequency of the measurement.

However, high resolution of a measured signal requires high frequency features of the input signal to be measured (i.e., high temporal frequencies for a time-varying signal, or high spatial frequencies in the case of an optical image). For example, in the conventional optical microscopy, an image cannot be captured with resolution higher than the diffraction limit of the optical system (i.e. $\lambda/2$ in case of free-space propagation). For example, considering free space propagation of an electromagnetic (EM) wave, if the EM wave propagates a distance z from an object plane to a detector much larger than the wavelength $\lambda$, then, since the transfer function of the optical system (CTF for coherent illumination or OTF for incoherent illumination) acts as a low-pass filter, all information carried by spatial frequencies larger than $1/\lambda$ are lost.

The present invention provides for reconstructing information (an input signal) at a resolution higher than that defined by the highest frequency of the measuring system or by a ratio between the spectral transfer-function and the signal-to-noise ratio $[SNR(\omega)<1/|g(\omega)|]$.

In this connection, it should be understood that sensing (measuring) data includes: detection of signals by a suitable sensor unit (detector), where the detected signals may be the input field or those resulted from a known interaction between the input data and reference data (e.g., correlation with known signals); and processing of the measured (detected) data. The detection procedure is to be as accurate as possible, using any suitable detector. Such accurate detection may include any de-coding procedure, provided certain predetermined coding (or pre-processing) of the signal occurred during its propagation to the detector, e.g. at the spectral plane. Such coding or pre-processing may be done by software and/or hardware (e.g. using a mask, e.g. a phase mask or grating). The principles of the invention are applicable to any measured data, irrespective of whether the detection procedure includes decoding or not. In case the coding/decoding is considered, the invented technique deals with the decoded measured data.

The present invention provides a novel processing technique for processing the measured data to recover details contained in the input information (input signal), that were filtered out in the detection stage, due to the response function of the measurement system (which includes a detector unit and possibly also signal collector(s) on the way to the detector). The filtering out results in that the measured amplitudes of those signals or signal components are so small that dividing them by the transfer response function leads to very large errors.

In other words, with the invented technique, the reconstructed/recovered information contains frequencies higher than the effective frequency cutoff of the effective response function of a measurement system. The reconstruction of measured data (optical field, in the context of optical imaging) according to the invention takes advantages of the principles of the known L1 minimization and compressed sensing techniques, in that it deals with the recovery of information (input signals) that is sparse in some known basis. It should be understood that a sparse signal is such that, in some basis it contains mostly zeros and very few elements differing from zero. The knowledge, or data, about the sparsity of the input field may only contain the fact that the signal is sparse in some basis, and the basis in which the signal is sparse might be a priori known or determined during the measurement procedure (e.g. during the reconstruction of the input field). It is also required that there is a known relation between the signal basis (where the information is sparse) and the measurement base, and back. For some systems, this relation might be written as a transformation operator. However, it should be understood that the present invention does not need such relation to be expressed as an operator, but just needs this relation to be known. The invention properly utilizes the measurement related data, namely data about effective response function of the measurement system, together with the above-described sparsity related data. As indicated above, the invention takes into account the effective response function of the measurement system being expressed by relation between the input field (represented in a basis in which it is sparse) and the output field. In this connection, it should be understood that considering the input field is represented in a basis in which it is sparse (e.g. by some kind of initial processing of the measured data using basic transformation), the relation between the sparsity basis and the measurement basis for linear shift-invariant measurement systems might correspond to the effective response function of the measurement system.

The invention allows for resolution enhancement beyond the effective frequency cutoff of the signal collector (physical limitation of the detection system). The present invention is based on the following: among all signals that can be written as a combination of some known basis functions, which yield the measured results after being "smeared" by the known transfer function (CTF or OTF), the sparsest one of the signals is to be found, i.e. the one comprised of the fewest basis functions. The inventors have termed this novel technique as SMARTER (Sparsity Mediated Algorithmic Reconstruction Technique for Enhanced Resolution) microscopy (in the sub-wavelength case) and SMARTER pulse diagnostics for the characterization of optical pulses.

Thus, according to one broad aspect of the present invention, there is provided a method for reconstructing an input field sensed by a measurement system. The method comprises; providing data (prior knowledge) about the sparsity of the input field (that the input signal (information to be recovered) is sparse in a known basis), and data about effective response function of the measurement system; and processing measured data based on said known data. This "prior knowledge" is used for processing the measured data, generated by the measurement unit, to recover the original information (input signal). The processing stage comprises: a determination of a sparse vector as a function of the following: said data on the sparsity of the input field, said data about the effective response function, and the measured data (output of the measurement system); and using the sparse vector for reconstructing the input information.

The technique of the invention is based on the understanding that, out of all the possibilities of extrapolating the spectrum of the measured data (which all correspond to the same measured data), given the prior knowledge described above, the extrapolation yielding the sparsest input signal (information to be recovered) is unique (in the absence of noise), or, in the presence of noise, provides the recovered information that is very close and the closest to the input information [8-12]. The technique provides for better reconstruction (higher resolution) if the signal basis and the measurement basis are the least correlated, or in other words they are "incoherent with one another" (here the term "incoherence" should not be confused with coherence properties of optical fields). It should, however, be understood that such condition as the least correlation between the signal basis and the measurement basis, while being preferable might be optional for the operational principles and results of the technique of the present invention. Instead, having the measured data occupying the majority of the basis functions in the measurement basis would suffice to recover the input signal properly. When the sparsity basis and the measurement basis are the least correlated, the number of necessary samplings (in the measurement basis) is the smallest.

This technique allows for resolution of the reconstructed input field to be well above an effective frequency cutoff of said response function.

Let us consider for example, optical imaging applications, where prior knowledge about the sparsity of the input field and about the effective response function is provided (i.e. the input image contains a small fraction of non-zero pixels in some known or determined bases, and transformation from the near field to the plane where the data is measured is known). Here, the simplest basis is the near field. The least correlated basis with the near field is the far-field (Fourier plane of the information). Hence, in the optical imaging applications, the technique of the present invention might provider better results if the measurements are taken in the far-field. The transformation relating the near field and the far field is simply the Fourier transform multiplied by the effective transform function which is CTF for coherent fields or OTF for spatially-incoherent fields.

In the same context of optical imaging, one can use another measurement basis: the image plane of an optical imaging system. In this case, the transformation occurred during the input field propagation through the optical measurement system includes the following: Fourier transforming the input signal, multiplying the Fourier transform by the CTF (or OTF), and applying a further Fourier transform (with some magnification) to the results of the multiplication. In this case, the measurement basis and the sparsity basis are identical. Nevertheless, the invented technique still works well, provided that the effective response function satisfies the following condition: the measured data occupies a large fraction of the measurement basis, and the transformation between the two bases is known.

Thus, generally, the present invention is applicable to any measurement basis, as long as the measured data occupies a large fraction of the measurement basis, and the transformation between the two bases is known. The current invention works well in all those measurement bases, provided just that the input image is sparse in a known basis.

For optical imaging applications, the measurement unit is configured for optical measurements, thus including an optical system (lenses etc.) and a suitable optical detector (or camera). As indicated above, the effective response function of such measurement unit is defined by a spatial frequency transfer function which is associated with a Coherent Transfer Function (CTF) for coherent illumination case or an Optical Transfer Function (OTF) for incoherent illumination. Using the method of the invention, the reconstructed input information can have resolution above a cutoff of the OTF (or CTF), which naturally defines the smallest resolvable feature (diffraction limited spot) of the optical imaging system. Preferably, the output field corresponds to a far-field image of the input field.

It should be noted that the present invention provides for reconstruction of signals with non-uniform phase, i.e. signals with varying phases, such as signal with positive phase at one point and negative phase at another, and in the most general sense—signals with phase that can vary arbitrarily between 0 and $2\pi$ from one point to another. Thus, no further assumptions, such as non-negativity of the signal, are needed. The recovery of signals (information) with non-uniform phase is done, as part of the above-described reconstruction procedure, by further using an iterative method called nonlocal hard thresholding (NLHT). This technique consists of allocating an off-support of the sparse signal in an iterative fashion, by performing a thresholding step that depends on the values of the neighboring locations (in real space). It should be understood and will be described more specifically further below that generally, that in some embodiments the processor utility of the present invention might be preprogrammed to identify whether the measured signal has uniform or non-uniform phase and accordingly selectively apply either a first processing model that does not utility NLHT (but utilize Basis Pursuit (BP)) or a second processing model that does utilize NLHT; or to eliminate the identification step and utilize the second, more general model utilizing the NLHT. In some other embodiments, where the invention is intended to deal with uniform-phase signals (e.g. dealing with reconstruction of input pulse shapes), the processor utility might utilize only the BP model.

According to another broad aspect of the invention, there is provided a system for reconstructing an input signal. The system includes an input utility which is capable of receiving and storing measured data generated by a measurement unit (being supplied directly therefrom or not). The measured data corresponds to an output signal generated by the measurement unit in response to an input signal which is to be reconstructed. The input unit also receives data indicative of the sparsity of the input field, and data indicative of the effective response function of the measurement unit (e.g. the spatial or temporal response function; or a relation between the input signal and the measurement signal). The system includes a data processor utility which is preprogrammed for analyzing and processing the received data. More specifically, the processor determines a sparse vector which is a function of the following: information about sparsity of the input signal, the measured output signal, and the data about the effective response function of the measurement unit; and uses the sparse vector to reconstruct the input signal by base transformation of the sparse vector onto the original base of the input signal.

According to yet another aspect of the invention, there is provided a system for reconstructing an input optical field. The system includes an input utility capable of receiving and storing measured data (generated by an optical measurement unit and supplied directly therefrom or not) corresponding to an output field generated by the optical measurement unit in response to the input optical field. The input utility also receives data indicative of the sparsity of the input optical field, and data indicative of the effective response function of the optical measurement unit. The system includes a data processor utility which is preprogrammed for analyzing and processing the received data to determines a sparse vector as a function of the sparsity data, the measured date, and the effective response function of the optical measurement unit; and uses the sparse vector to reconstruct the input field by base transformation of the sparse vector onto the original base of the input signal.

In a yet further aspect, the invention provides a measurement system comprising: an imaging system defining an input field propagation to an optical detector, and a control unit having a processor utility for processing measured data output from said detector, the processor utility being configured and operable for processing the measured data based on data about sparsity of the input field and data about an effective response function of the imaging system to reconstruct the input field with resolution above an effective cutoff of said effective response function.

In some other embodiments, the invention is used for processing temporal profile of data, the measured data being that produced by an electronic sensing system. In this case, input field to be measured and reconstructed may be a pulse (e.g. optical pulse), especially a short pulse, namely relatively short as compared to the physical limitation (e.g. rise time) of a pulse detector. A general trend in short pulse-shape measurement techniques and devices is that measurements at higher resolution and larger bandwidth require more complicated and costly devices or systems. Consequently, it is of great interest to increase the resolution of a pulse-shape measurement device or system by post recovery algorithms.

The most attractive application of this aspect of the invention is for reconstructing the profile (intensity profile or amplitude and phase profiles), especially useful for ultra short pulses (in picoseconds range and shorter). In these embodiments, the effective response function of the measurement unit corresponds to a temporal frequency response of the electronic sensing system. Examples of measurement systems/detectors with which the invented technique can advantageously be used include the following: oscilloscope, photodiode, streak camera, cross correlation with a reference filed/signal, auto correlation of the signal/field with itself, frequency resolved optical gating (FROG), Spectral Interferometer for Direct E-field Reconstruction (SPIDER), Cross-correlation Frequency resolved optical gating (XFROG), GRENOUILLE, TADPOLE.

Thus, the invention, in it's yet another broad aspects, provides a method and system to recover the profile of a short pulse (an electronic pulse, an optical pulse, etc.), from measurements taken by a relatively slow measurement system (slow detector) in the meaning that the rise time of the detector is longer than the pulse duration. In these embodiments, the known (initially provided) data includes data about the sparsity of the input pulse and an effective response function (e.g. temporal frequency response function defining a relation between the measurement basis and the signal basis). The shape of the pulse can be complex and its spectrum can include frequencies at spectral regions beyond the effective cutoff frequency for the measurement. Reconstruction uses the measured output signals, the data about the effective transfer function of the detection system, and the fact that short pulses are inherently sparse (in time).

As indicated above, the measured data may include detection of the input field or its interaction with certain reference signal. For example, an optical short pulse can be cross-correlated with another (reference) pulse and the cross correlation signal is measured. The invention provides for reconstructing the input field (recover the structure (amplitude and phase) of a short input pulse, being e.g. electronic or optical pulse) by processing such measured data as well. Reconstruction uses the output cross correlation signal, the known shape of the reference pulse and the interaction model (i.e. cross correlation) between the two pulses.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 2A to 2C illustrate the principles of the image reconstruction according to the general art;

FIGS. 8A to 8F compare the technique of the invention to the conventional technique for reconstructing 2D objects;

DETAILED DESCRIPTION OF EMBODIMENTS

Figure 1:
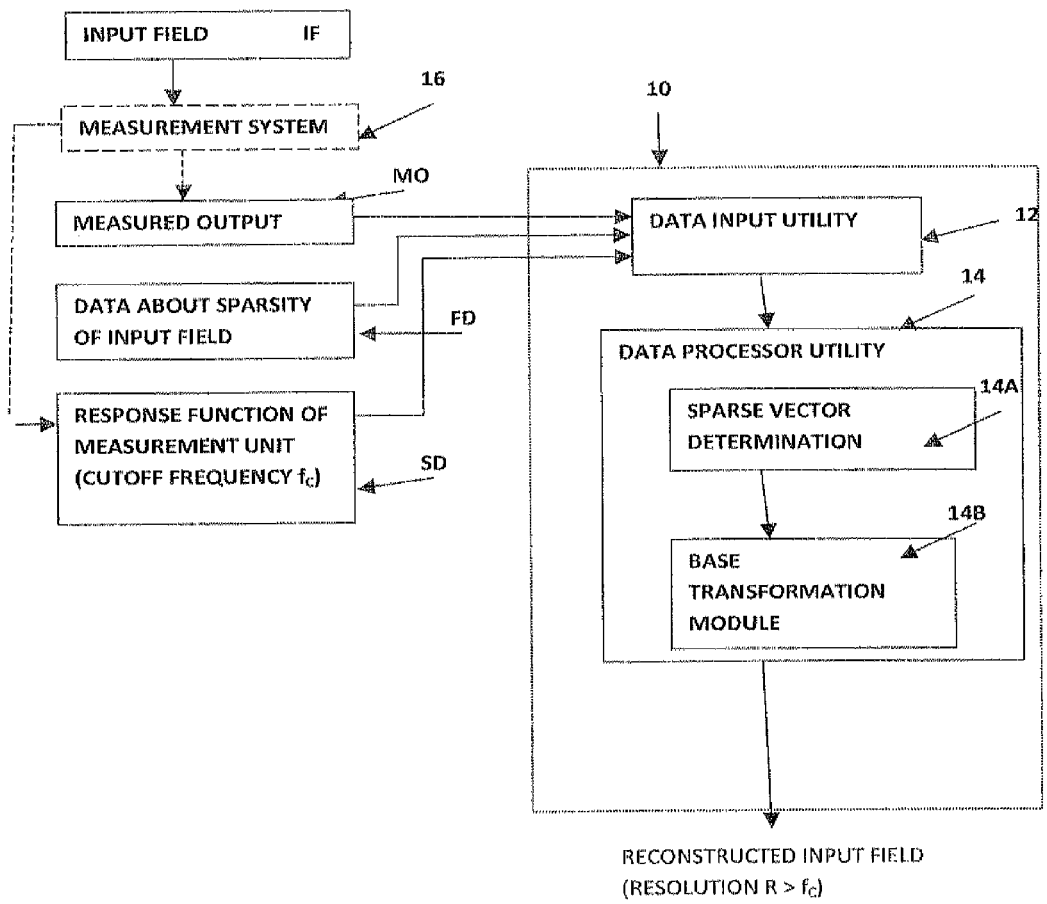
FIG. 1 is a block diagram of an example of a system of the invention for reconstructing an input field.

Reference is made to FIG. 1 which shows schematically, by way of a block diagram, an example of a system 10 of the invention for reconstructing a sparse signal from an input field IF. The input field IF may for example be an optical field varying in the spatial domain, or an optical field varying in the time domain. The input field IF can be complex (carrying information in both its amplitude and phase) or a real function of spatial and/or temporal coordinates. The system 10 is a computerized system for processing input data. Thus, the system 10 includes a data input utility 12 and a data processor utility 14. The system may also include a memory utility and a data presentation utility (e.g. display) which are not specifically shown. Also, the system may be connectable to a computer network (e.g. the Internet) and is thus installed with an appropriate communication utility. The system 10 is configured for processing measured data which corresponds to measured output MO of a certain measurement unit 16. It should be understood that the system may perform real-time processing of the measured data, while the system is connected to the measurement unit (via wires or wireless signal transmission); or may perform post-processing of the measured data being applied to output data of the measurement system previously stored in a memory utility of the system 10, or another appropriate memory device.

The measurement system 16 may be of any suitable type which detects (receives and records) the input field IF (e.g. optical, electronic signals) and produces output field (measured data) indicative thereof. The detected input field may be an input signal coming from an object or a result of interaction of such input signal with certain reference signal. The construction and operation of the measurement system 16 in general do not form part of the present invention; and the invention can be used with any type of measurement system of the kind having an effective response function associated with a spatial or temporal frequency response of its output to the input signal (field). The effective response function may be determined by a specified mathematical relation defining its measured output MO to the input field IF.

The measurement system 16, configured for measuring an input field IF, includes an appropriate detector (e.g. pixel matrix of the camera; oscilloscope; photodiode, etc.), and may also include a low pass or a band pass filter for spatial or temporal frequencies. It should be noted that one or more physical elements of the system may act as a low pass (or band-pass) filter, such as an aperture assembly (formed by one or more apertures, e.g. one or more lenses); and/or by the free space propagation of light from an object plane to a detector plane ("image plane"). The low pass (or band-pass) filter can also arise from the characteristics of the detector itself, which may only minimally respond to high spatial or temporal frequencies, so that these parts of the data are buried in the noise of the measurement system 16. Additionally, in some measurement systems the low pass filter may arise due to operational technique of the system or photon life-time, e.g. in Fourier transform infrared spectrometer (FTIR) or Fabry-Perot spectrometer. For example, limiting a maximal delay time, or retardation distance in FTIR spectrometer limits the resolution of the measured spectrum. The mathematical relation between the measured data MO produced by the measurement system 16 and the input field IF may be represented as a response function (or transfer function) which acts as a low pass (or a band-pass) filter for high spatial or temporal frequencies. For nonlinear systems or for systems that are not shift-invariant, such relation may be represented by some other expressions. According to the invention, the measured output MO of the measurement system is a result of a specific transformation of the input field IF caused by the physical properties of the measurement system 16. Considering the optical imaging measurement unit, the output of the measurement unit is preferably a result of far-field imaging of the object. For example, the detector plane is located substantially at Fourier plane of the aperture assembly. This will be described more specifically further below with reference to FIGS. 6A-6B.

It should also be noted, although not specifically shown, that the measurements system 16 may include a coder utility for coding the input filed. The coder may be software and/or hardware utility, using a mask, e.g. a phase mask or grating. Accordingly, the processor utility 14 may be configured for carrying out initial decoding of the received measured data.

Also, the measurement system may be configured for cross correlating an input signal with a reference signal, in which case the input field IF is a result of such cross-correlation, while the signal to be reconstructed in said input signal. The system may be configured to autocorrelation to an input signal; the measured input field would be a result of autocorrelation.

Thus, the input utility 12 is responsive to input data for receiving (and typically storing) measured data from the measurement system 16 corresponding to an output field MO generated by said measurement system 16 in response to an input field IF. Also, the system (e.g. via the same input utility or another input port) receives field-related data FD and sensor-related data SD. The field-related data FD includes data about sparsity of the input (e.g. optical) field (including the mathematical basis in which it is sparse). The sensor-related data SD includes data indicative of the effective response function (e.g. mathematical relation between the measured output MO and the input field IF) of said measurement system 16. In case of optical measurement system, the effective response function may be defined by a Coherent Transfer function (CTF) or an Optical Transfer Function (OTF) of the measurement system, which functions are in turn determined by aperture(s), if any, and the free space propagation path to the detector.

In the description below, the effective transfer function of the optical measurement unit is at times referred to as "Optical Transfer Function" or "OTF". However, it should be understood, and also described above, that this term should be interpreted broadly to refer to the CTF as well, when appropriate, and more generally to relation between the input field and the output (measured) field. With regard to data about the sparsity of the input field, as described above, this includes the knowledge that the field is sparse at certain known basis, and probably also a relation between the sparsity basis and the measurement basis.

The data processor utility 14 is configured and operable (i.e. is preprogrammed) to analyze and process the received data to reconstruct the input field IF (irrespective of whether it has a uniform or a non-uniform phase) and with resolution higher than the resolution of the measurement system 16 which is limited by the properties of the measurement system 16 (e.g. by the effective cutoff frequency of the frequency response function). The processor 14 may include inter alia a sparse vector determination module 14A and a base transformation module 14B being software utilities running appropriate algorithms. The sparse vector determination module 14A operates to process the received data (measured output MO, data about sparsity of the input field SD, and data about the effective response function FD, e.g. the mathematical relation between the measured output MO and the input field IF) and determine a sparse vector (x). The latter is thus a function of multiple parameters including said data indicative of the sparsity of the input field, the output of the detector, and the effective response function. The base transformation module 148 operates to use the sparse vector (x) for determining a reconstructed input optical field ($y_{rec}$) as a function of said sparse vector and said data indicative of the sparsity of the input field. This enables reconstruction of the input field (i.e. real space reconstruction).

In a specific but not limiting example, the reconstruction process includes the following:

(a) solving the following equation:

$$\hat{x} = \underset{x}{\operatorname{argmin}} \|x\|_1 \quad \text{s.t.} \quad \begin{cases} \sqrt{(FAx-b)^T \cdot W \cdot (FAx-b)} < \varepsilon \\ x \geq 0 \end{cases} \quad (1)$$

where x is a sparse vector, F is a partial Fourier matrix up to a cutoff frequency $v_c$ (thus F exemplifies an effective response function of the measurement unit 16), A is a matrix representing the basis in which said signal is sparse (i.e. the data about sparsity SD), b is the measurement in Fourier domain after normalization in division by the effective response function (e.g. OTF) of the measurement unit (i.e. measured data as a function of the sensor-related data), $\varepsilon$ is a parameter determined by a noise value, and W is a diagonal matrix containing squared magnitude of said response function, for increasing frequency values on its diagonal; and (b) reconstructing said input field (e.g. image) as:

$$y_{rec} = A\hat{x} \quad (2)$$

In a simpler case, wherein the transfer function of the measurement system has the form of a sharp cutoff (for example in case of coherent illumination where the CTF is equal to unity for frequencies below the cutoff and vanishes for frequencies above the cutoff), the normalization of the measured data (b) and the normalization matrix W can be omitted and the transfer function is represented solely by the partial Fourier matrix F. Equation (1) will thus be of the form:

$$\hat{x} = \underset{x}{\operatorname{argmin}} \|x\|_1 \quad \text{s.t.} \quad \|b - Fx\|_2 \leq \varepsilon \quad (3)$$

In order to explain the reconstruction method of the invention, let us consider the more simple case represented by above eqn. (3). Let us consider the relation between the measured data and the input field expressed via the effective response function $R(\xi - \xi')$:

$$b^{detector}(\xi) = \int g(\xi') R(\xi - \xi') \xi' \quad (4)$$

where $b^{detector}(\xi')$ is the measured data (in a particular mathematical basis) and $g(\xi')$ is the input field (in a particular known mathematical basis, which can be the same or different from that of the measured data). It should be noted that $\xi$ and $\xi'$ can be multi-dimensional (i.e. they can have vectorial character).

Expression (4) covers all cases, where a transfer function is involved, i.e. $\xi$ can be any coordinate, namely it can be a spatial coordinate, a time coordinate, and others.

As indicated above, the invention utilizes the fact that the input field g' is sparse, or performs certain preprocessing (base transformation) to transform the non-sparse input into its sparse representation in a certain known basis.

Thus, in cases where the original signal is not sparse, it is typically possible to transform the initial data into another mathematical basis where it is sparse by a linear transformation $M(\xi' - \eta)$ $$g(\xi') = \int f(\eta) M(\xi' - \eta) d\eta \quad (5)$$

where $f(\eta)$ is the original data and $g(\xi')$ is the sparse representation thereof. Generally, the transformation into the basis in which the original signal is sparse may be a Linear or Nonlinear basis transformation or any general basis transformation.

As indicated above, the present invention is suitable for any measurement application where an effective response function is involved (i.e. the frequency transfer function and/or relation between the measured data and the input field), for any coordinate, being a spatial coordinate, a time coordinate, and others. Additionally, also the type of transfer function may not be specified, i.e. the transfer function can describe any measurement system (e.g. spatial, temporal), and the transfer function can be either continuous or discrete function. A particular feature of transfer function is that it can exhibit a sharp and/or a smooth cutoff for high (spatial or temporal or other) frequencies. A sharp cutoff is defined as the highest frequency at which the transfer function is not vanishing. A smooth cutoff is defined as the highest frequency for which the value of the transfer function is not buried in the noise of the measurement system. Both cases resemble the same physical situation: frequencies beyond the effective cutoff (sharp or smooth) are lost and cannot be recovered by conventional reconstruction schemes (e.g. de-convolution), since then one has to divide the measured data by the transfer function; but if the amplitude of the transfer function is below the noise level such division leads to very large errors, rendering the high frequencies contents of the input field irretrievable.

The invention provides a method of reconstructing the sparse input field $g(\xi')$ and, if required, also the non-sparse initial data $f(\eta)$. This method entirely relies on the knowledge that $g(\xi')$ is sparse, and on the knowledge in which basis it is sparse. Hence, the transfer function $R(\xi-\xi')$ and the linear transformation $M(\xi'-\eta)$ are known. For the purposes of reconstruction the input field $g(\xi')$, which is non-uniform in phase (and possibly also amplitude), the present invention provides for a novel iterative technique for reconstruction of sparse signals. In particular, in the context of optical imaging, detection of signals with non-uniform phase might be important. The standard basis-pursuit (BP) approach used in this field is incapable of resolving fine details of signals with alternating phases. The present invention extends this technique to account for non-uniform phase by adding an iterative nonlocal thresholding procedure, or more specifically the Non Local Hard Thresholding NLHT procedure, which is part of this invention. This algorithm allocates an off-support of the sparse signal in an iterative fashion, by performing a thresholding step that depends on the values of the neighboring locations (in real space). In each iteration, the algorithm uses a BP step which takes into account noise with levels (this algorithm is referred to in the literature as BP denoising BPDN [13]):

$$(P_1)\min_g \|g\|_1 \text{ subject to } \|b - Fg\|_2 \leq \varepsilon \quad (6)$$

Here, g is the unknown sparse information, b is the measured data, F is the (known) transformation matrix which corresponds to effective response function that transforms information from the initial basis of the sparse information g (the signal basis) to the measurement basis, where the measured data b is obtained. It should be noted that both basis can be different or identical. The value $\varepsilon$ is a small parameter determined by the noise of the measurement system. It should be understand, that parameters b and F are known, whereas g is unknown. However, F cannot be inverted (due to the transfer function which exhibits a cutoff). Hence, one searches for the sparsest solution g, which satisfies Fg=b. In order to find this solution, the invented technique utilizes determination of the vector g according to the minimization problem given above. The reconstructed vector g is then the argument of the found minimized value, i.e.

$$\hat{g} = \underset{g}{\operatorname{argmin}} \|g\|_1 \text{ subject to } \|b - Fg\|_2 \leq \varepsilon. \quad (7)$$

Based on the solution of each step, the off-support of the signal is allocated by performing the NLHT. The latter consists of zeroing out each element of d which is below a fixed threshold along with its neighbors and considering such element as off-support. In the next iteration, the BPDN step is repeated with the additional constraint that the locations corresponding to the off-support are set to zero. If the original data f is not sparse in the original signal basis, it is possible to transform it into another basis, where this data is sparse by a linear transformation g=f, so that Eq. (6) takes the modified form $$(P_1)\min_g \|g\|_1 \text{ subject to } \|b - FMf\|_2 \leq \varepsilon \quad (8)$$

In optical imaging, two important cases are distinguished and shall be high-lightened in the following. The first one is the coherent case, which is covered by the coherent transfer function CTF. The field evolution of the optical amplitudes E(x, y, z) is described by $$E(x,y,z) = \{FT^{-1}\{E(x,y,z=0)\}H(k_x,k_y,z)\} \quad (9)$$

where FT and $FT^{-1}$ denotes the Fourier transform and inverse Fourier transform, respectively, and the CTF is given by $$H = \exp\{iz\sqrt{(\omega/c)^2 - (k_x^2 + k_y^2)}\}. \quad (10)$$

Here, $\omega$ is the optical angular frequency and c is the speed of light. It should be noted that the CTF does not vanish anywhere. However, above the threshold $|k_x^2 + k_y^2| > k_c$ it exponentially decays, so that by a measurement in the optical far-field the waves are evanescent and completely buried in the noise (of the measurement system and the detector). Therefore, they are said to be lost. This can be easily modeled by assuming a strong cutoff, using a slightly modified transfer function $$H(k_x, k_y) = \begin{cases} 1, & |k_x^2 + k_y^2| < k_c \\ 0, & \text{else} \end{cases} \quad (11)$$

which is exactly zero beyond the cutoff. The second case it the spatially incoherent case, which is described by the evolution of the intensities I(x, y, z)

$$I(x,y,z) = FT^{-1}\{FT\{I(x,y,z=0)\}H_{ic}(k_x,k_y,z)\}. \quad (12)$$

For the incoherent case, where one deals with intensities and the incoherent transfer function (optical transfer function) OTF, we have $$H_{ic}(k_x, k_y) = \begin{cases} 1 - |k_x^2 + k_y^2|/k_c, & |k_x^2 + k_y^2| < k_c \\ 0, & \text{else} \end{cases} \quad (13)$$

It should be noted that here already the idealized transfer function is used, which is exactly zero beyond the cutoff (i.e. the evanescent waves are cut; these waves cannot be measured in the far-field anyhow).

Reconstructing data beyond the cutoff of a response function corresponds in mathematical terms to an under-determined system of equations, which cannot be inverted. The problem arises from the fact that such a system has an infinite number of solutions, which all produce the same image as seen in the microscope. The crucial task is to extract the one correct solution, which is, in other terms, the solution "that makes the most sense". This is where sparsity comes into play. When decomposing a light field (or any data) into a set of basis functions, then this data is said to be sparse when most of the projections on the basis functions are negligibly small. Since every basis function represents two degrees of freedom (DOF), one for the projection on it and the other one of the position, a sparse sample carries also only a limited amount of DOF. Due to the analytic character of the propagating light (electromagnetic fields are known to be always analytic functions), the number of DOF of this field must remain constant during propagation in free space. Accordingly, the DOF in the near-field must match those in the far-field. In general, when the number of DOF contained in a function is N, then one requires at least N measurements at different positions of this function. One can therefore conclude that performing a number of measurements (number of measured outputs) in the low frequency region solely, which exceeds the number of DOF, still allows for reconstructing the entire input field. The issue is to know how many of such measurements are required. This is answered by compressed sensing in solving a different super-resolution problem associated with the geometrical resolution of the detector pixel matrix. It is an essential result of compressed sensing that, in the absence of noise, sparse solutions are unique [8-10] irrespective of how sparse they are. This means that, for sparse samples, from all the possible solutions which would create the blurred image seen in the microscope, only one is sparse. Hence, if one knows that the input field is sparse and only that, one just needs to find the only sparse solution which generates the observed blurred image. The uniqueness of the solution guarantees that this is the correct one. In the presence of noise, the solutions are not unique anymore. However, one can rigorously prove that the error is bounded. This means that all the different sparse solutions are very similar. Hence, searching for the sparsest solution will result in a reconstruction that is very close to the ideal one [11,12]. In its original context, compressed sensing has used sparsity to reduce the number of samplings of a given signal while still being able to recover the signal properly. This concept was later extended to in the domain of digital image processing, to use the knowledge about sparsity of the input field to improve the resolution of image sampled by a given pixel matrix after recording the input field. This is because currently compressed sensing uses sparsity to improve resolution of already-sampled data, without attempting to use the transfer function of the system and without extrapolating the recovered bandwidth beyond the cutoff frequency of the measured output. As an example, let us consider a CCD camera with m×n pixels recording the image of the diffraction-limited spot of a sub-wavelength source. The common knowledge is that one can use sparsity to improve the sampling rate of the CCD camera, i.e. one can achieve a resolution of $\alpha m \times \beta n$ with $\alpha, \beta > 1$. However, in this (commonly known) scheme, the smallest resolvable feature would still be the diffraction-limited spot (defined by the cutoff spatial frequency of the imaging system). Specifically, this method cannot yield sub-wavelength resolution, mainly because it does not use the effective transfer function of the measurement system, e.g. corresponding to relation between the input (real-space) basis and the measurement (image) basis. Therefore, this approach can be considered as "interpolation improvement" between the measured sampling points.

The inventors have found that, in order to achieve true bandwidth-extrapolation, the effective response (transfer) function $R(\xi-\xi')$ of the measurement system (and not only of the detector), has to be taken into account. Notably, such an effective transfer function can also act in a different basis than the measurement basis, where it can act as a low-pass filter. As an example from optics, in order to low-pass filter an optical signal, the transfer function should act in Fourier space. The knowledge about the effective transfer function allows the extrapolation of the bandwidth beyond the cutoff of the transfer function of the measurement system, or a given interpolation between the sampling points of the detector. Hence, the present invention allows the recovery of the high frequency components of the input field beyond the cutoff frequency of the imaging system. Following the example given above, with the sparsity-based approach used in the invention together with the effective transfer function of the measurement system, one is able to recover the sub-wavelength features of the input field from measurements taken in the far-field of the input field origination, or in the (blurred, diffraction limited) image plane, or in any other plane in between.

It should be noted that sparsity can be used to enhance resolution even in a system which cannot be described by a convolution with a transfer function, i.e. which is not expressed by Eq. (4). A good example is partially-incoherent light, for which no transfer function exists, but rather an integral relation describes the relation between the light field at one plane and the field (or intensity) at another plane [14]. Hence, one cannot define a simple relation Fg=b. However, it is still possible to enhance resolution of such a system since the relation between g and b is well defined.

It should also be noted that in some cases the field related data FD does not include the exact basis in which the measured field is sparse, but includes some information about a family of such bases where some bases of the family are appropriate for signal reconstruction. One of the suitable basis is to be chosen being a basis that will provide satisfying reconstruction. In such cases, the data processor utility 14, and more specifically, its sparse vector determination module 14A may be configured to identify the appropriate basis for reconstruction of the input field IF from the measured field MO as will be described further below.

Figure 3A:
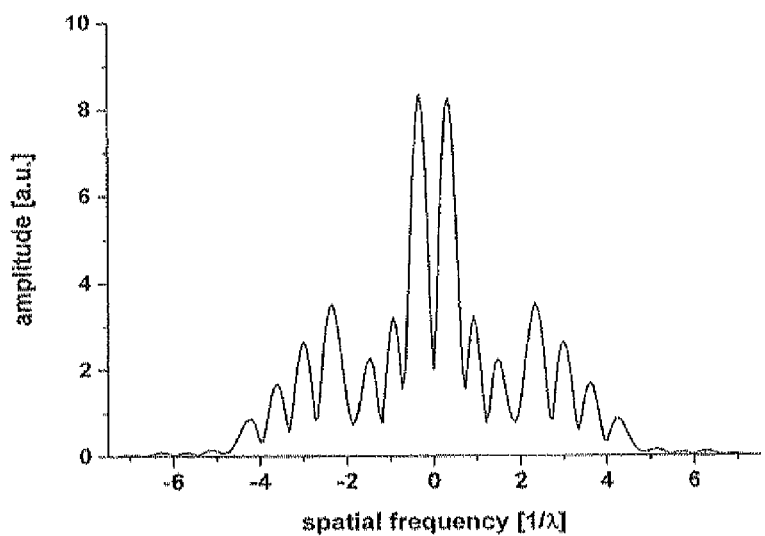
FIGS. 3A and 3B compare the results of the reconstruction technique of the present invention to that of FIG. 2A-2C.
Figure 3B:
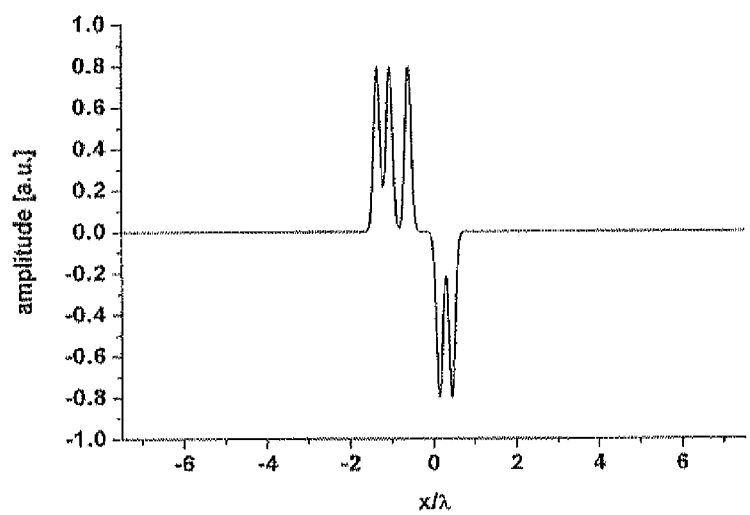

Reference is now made to FIGS. 2A-2C and FIGS. 3A-3B which exemplify the principles underlying the invention, for the case of coherent light imaging using the CTF [15]: FIGS. 2A to 2C illustrate the principles of the image reconstruction according to the general art, and FIGS. 3A and 3B compare the results of the reconstruction technique of the present invention to that of FIG. 2A-2C.

In FIG. 2A, sub-wavelength information is represented by a one-dimensional optical image, which in this example has an alternating phase. The image presented in the figure is a sparse, sub-wavelength input field, which is shown in the form of amplitude vs. position graph. The field shown is sparse in the meaning that it has a zero value at most points in space and a value different than zero only in a few points. The position axis in the graph is scaled by a wavelength λ being used. As can be seen from FIG. 2A, the input field has features smaller than the wavelength λ (sub-wavelength input field). Also, in this example, the input field has a non-uniform phase; in this particular example the input field comprises positive and negative values. As described above, the resolution of imaging is limited by the diffraction limit (λ/2), thus spatial frequencies higher than 1/λ cannot be transmitted by optics, presenting a sharp cutoff frequency of the optics (for the coherent illumination case). FIG. 2B shows the optical far-field of the input field, which practically is the Fourier transform of the input field (FIG. 2A), truncated at spatial frequency of (±1/λ). Such a sub-wavelength field, when being imaged (optically processed) using conventional methods results with a blurred image, as shown in FIG. 2C. As can be seen in FIG. 2C, all of the sub-wavelength features of the original input field (FIG. 2A) are lost in the image, due to the diffraction limit, or generally cutoff frequency of the low-pass filter of the measurement unit.

The reconstruction is based on the knowledge that the input field is sparse in a known basis, and on the use of the known response function of the measurement unit, i.e. that of its low-pass filter. In this particular case, the input field is sparse in real-space: the number of non-zero pixels in FIG. 2A is much smaller than the total number of pixels. For the reconstruction itself the NLHT algorithm (as described above) was applied.

FIGS. 3A and 3B exemplify the results of the reconstruction algorithm according to a specific but not limiting example of the invention. FIG. 3A shows the reconstructed signal in Fourier domain. The field is reconstructed in a way that the high spatial frequencies (frequencies above the cutoff) are restored, and thus restore the original input field. The reconstructed field is shown in FIG. 3B and includes all of the sub-wavelength features of the original input field. It should be noted that in this particular example, the measurement basis is the Fourier space describing spatial frequencies (the optical far field), and the basis of the IF is the real space.

As indicated above, with the sparse images, the degrees of freedom of image reconstruction algorithm would be strongly reduced. Given that the relative fraction of occupied basis functions is β (<1), β samples of the signal are to be determined in an alternative basis expansion. However, the measurement basis is to be chosen wisely such that the combined matrix describing the signal and measurement bases is (left-) invertible, to ensure the existence of a solution. If the number of measurements is restricted, then having a measurement basis with the lowest correlation with the signal base functions ensures reconstruction under minimum number of measurements. This statement, similar to the uncertainty principle in quantum mechanics, prevents a signal from being sparse in both bases, and ensures that, if the signal is sparse in one of the bases, it will be very spread in the other. Therefore, almost each projection will yield a non-zero informative measurement. Classical examples of maximally uncorrelated bases are the spatial and Fourier domains: A highly sparse signal, e.g. a single Dirac delta function is Fourier-transformed into a spread function that covers the entire spectrum. In the sub-wavelength optical embodiment, the measurement basis is chosen as the low spatial frequencies in the Fourier domain. If the number of measurements is not restricted, then the measurements can be carried out in any basis, including the same basis as the signal, provided only that the measured data projects onto a sufficient number of basis functions, corresponding to the number of degrees of freedom of the input field.

In view of the above, according to the invention, measuring these low spatial frequencies will be sufficient to recover the signal if it is sparse in a real-space basis, and if the relation between the signal in real-space and the measurement basis is known. The measurement basis can be the far-field (Fourier plane) of the input field, or the image plane where the measured data is a blurred image of the input field, or any other plane in between, as long as the relation to the real-space (input) plane is known, and the measured data projects onto a sufficient number of basis functions in the measurement basis.

The technique of the present invention exploits, in addition to the knowledge that the signal is sparse, information about the measurement system, namely the effective transfer function (CTF or OTF, or relation between the input field basis and the measured data basis as explained above), to resolve the fine sub-wavelength features, and further for the case of non-uniform phase of the signal preferably exposits the above-described NLHT. The present invention utilizes preferably the far-field image data thus simplifying the restoration of the sub-wavelength features.

Figure 4A:
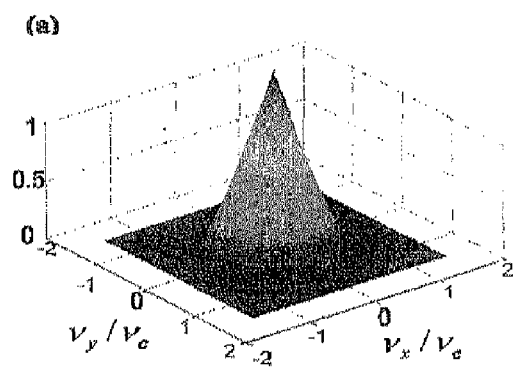
FIGS. 4A and 4B exemplify the Optical Transfer Function and frequency cutoff defined thereby, in respectively 2D and 1d-representation.
Figure 4B:
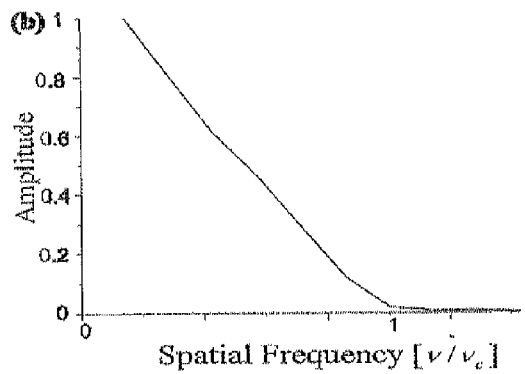

An example of the OTF of a typical optical system is shown is FIGS. 4A and 4B. In FIG. 4A, a simulated OTF in a 2-dimensional system is shown, and FIG. 4B shows a measured OTF of a 1-dimensional experimental optical system.

Figures 5A, 5B, 5C, 5D, 5E, 5F:
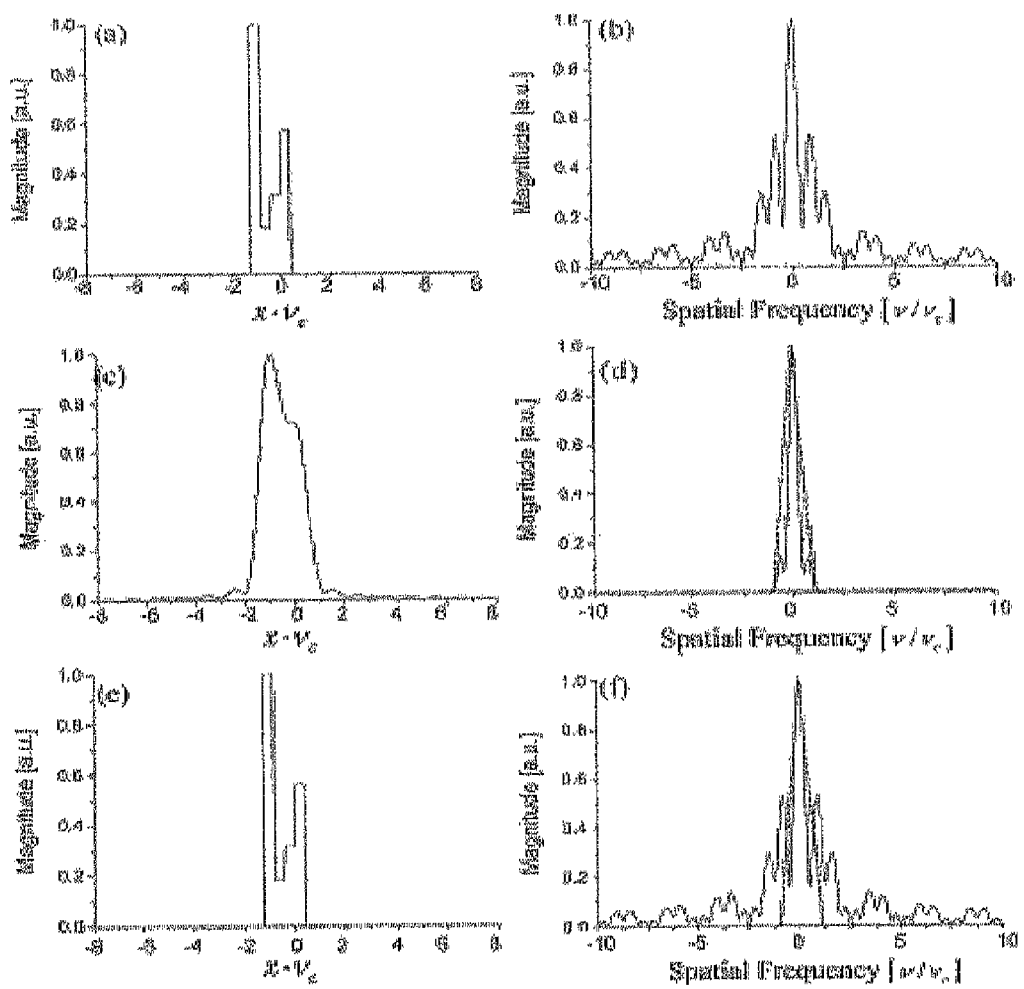
FIGS. 5A to 5F exemplify the image reconstruction procedure according to the conventional technique and of the invention.

Reference is now made to FIGS. 5A-5F which exemplify the principles underlying the invention when used for reconstruction of input field with incoherent light imaging. FIG. 5A shows a sparse sub-wavelength image as a magnitude vs. position graph, the position axis in the graph is scaled by the spatial frequency cutoff of the imaging system. Spatial Fourier transform of the image in FIG. 5A is presented in FIG. 5B. In this example, the image of FIG. 5A corresponds to imaging by incoherent illumination, and therefore the OTF of the imaging system is of a triangular shape, as seen in FIG. 5D (graph G). FIG. 5C shows the image of FIG. 5A obtained using the conventional methods.

As indicated above, the present invention reconstructs a sub-wavelength image taking into account the OTF of the imaging system, being a sharp cutoff or having a more general form. The reconstruction results, according to the present invention, for the image of FIG. 5A are shown in FIG. 5E, and the Fourier transform reconstruction is shown in FIG. 5F. It should be noted that in this example, the measured data is in Fourier space (i.e. spatial frequencies), whereas the input field is in real space.

Figure 6A:
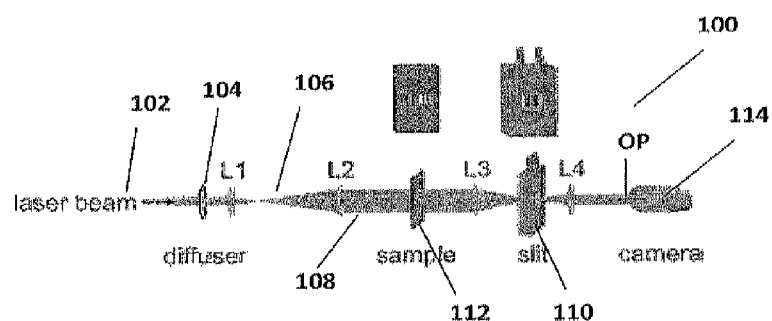
FIGS. 6A and 6B show two examples respectively of an optical system suitable to implanting the present invention.
Figure 6B:
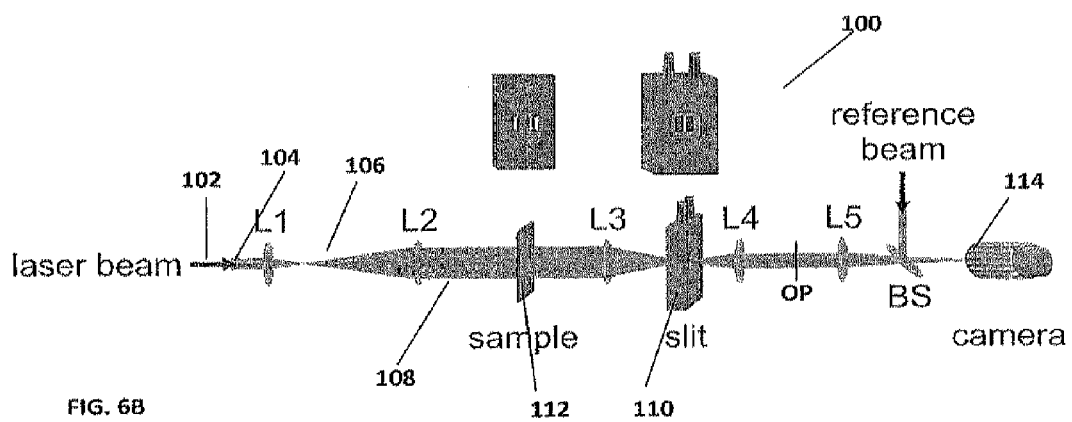

Reference is now made to FIGS. 6A and 6B exemplifying two experimental setups of a measurement unit, generally at 100, both using a 4-f-setup optical system design, where FIG. 6A exemplifies near field imaging and FIG. 6B exemplifies far field imaging. To facilitate understanding, the same reference numbers are used for identifying components that are common in all the examples. The measurement unit 100 includes a light source unit 102 formed by a laser source (not shown), a diffuser 104 for producing partially incoherent light, and a beam expander 106 formed by lenses L1 and L2; an optical system 108 configured as 4-f telescope including a tunable slit 110 and lenses L3, L4; and a light detector 114 (camera). The optical system has a spatial frequency cutoff, defined by a low pass filter, which in the present example is constituted by slit 110. The light source unit is associated with a laser source producing a laser beam (e.g. Verdi 5W, Coherent Inc.) at λ=532 nm. This beam is collimated using the telescope/expander 106 of lenses L1 and L2, and passes through a sample 112 presenting a mask of certain arrangement of spatial features. The information upon the mask 112 is imprinted on the beam (i.e. the beam is spatially coded by the mask pattern), and serves as the input signal information. The image is optically Fourier-transformed by lens L3. The adjustable slit 110 is placed at the focal plane of the lens L3 (where the Fourier spectrum is obtained), acting as a controllable low-pass filter. The aperture of the adjustable slit 110 defines the highest resolution in the image recovered optically at the output plane OP, being the image plane (defined by the camera light sensitive surface) in FIG. 6A and is located in front of the camera imaging lens L5 (in the back focal plane thereof) in FIG. 6B. Also shown in FIG. 6B is a beam splitter BS and a reference beam. Here, interaction between the reference beam and the laser beam collected from the sample is used for phase detection (i.e. phase effect on the interference pattern, as typically used on sample inspection by OCT based techniques). It should be noted that the setups 100 practically exemplify all possible physical features of the low-pass filtering due to the optical transfer function, where a transmission window (the size and/or shape of the slit 110) is arbitrary and tunable in both size and symmetry. The system 100 is used for imaging an object (sample 112) with varying spatial frequency window 110, such that the diffraction limited spot of the system can be in any size according to the width of the slit opening. The Fourier transform back into the real domain is then accomplished by another lens L4.

Thus, in this examples, the measurements are carried out with a conventional CCD camera 114 (Cohu 3400), placed either at the Fourier plane (FIG. 6B), where it measures the cut spectrum, or at the image plane (FIG. 6A) at the output of the 4-f system (lenses L3 and L4), where it measures the filtered-information. The Fourier spectrum is measured in a Fourier plane which is created by another lens L5 (FIG. 6B). The actual number of measurements in each frame is determined by the number of pixels in the camera. The camera provides direct measurements of the power-spectrum (or the intensity). The phase information, either in the Fourier plane or in the filtered-image plane, is provided by interference with a plane wave propagating at a known angle. Finally, optical information is inherently 2D, whereas the current experiments were dedicated on 1D information. In order to extract the 1D information from the 2D images, the measured information is averaged over the direction along which the information is uniform, and a cross-section is taken through the averaged image.

Figure 7C:
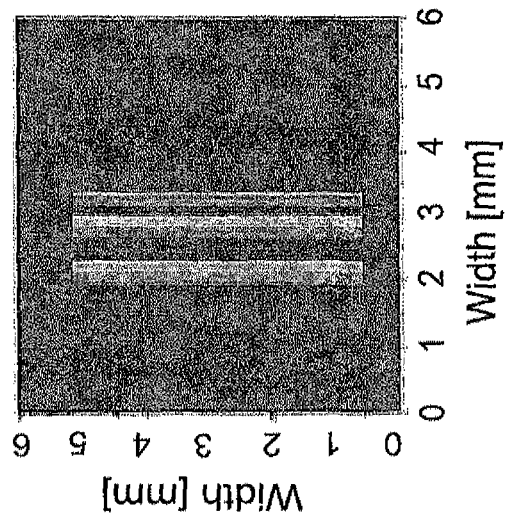
FIGS. 7A to 7C show the experimental results of the technique of the invention using system of FIG. 6A.
Figure 7B:
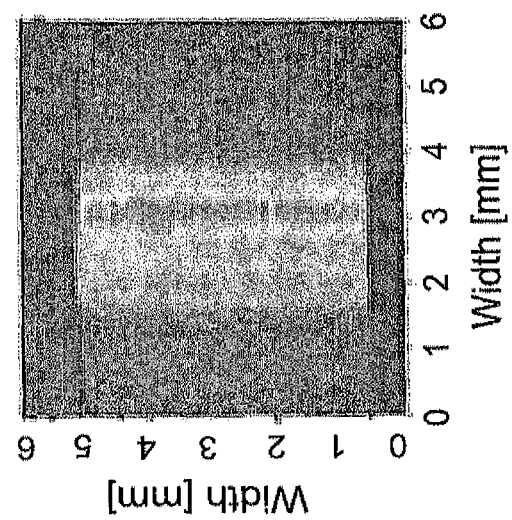
Figure 7A:
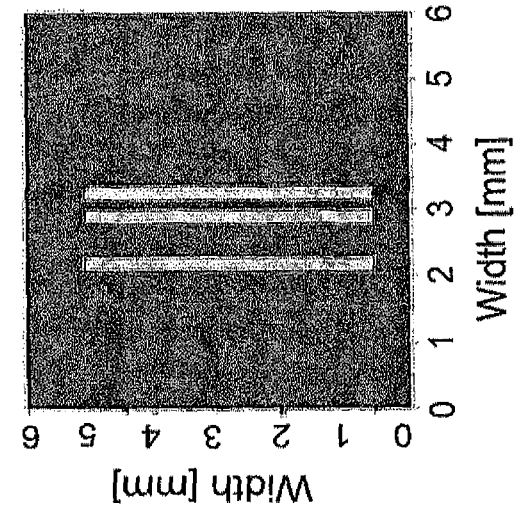

Images collected using the above described optical system are presented in FIGS. 7A and 7B, and FIG. 7C presents a reconstructed image resulted from the technique of the present invention based on the image in FIG. 7B. The image of the sample (object) shown in FIG. 7A is the actual input information (input field) acquired right after the input plane (at a distance of 1 mm therefrom). The image shown in FIG. 7B corresponds to the closed state of the slit 110 to block high spatial frequencies and provide for blurred image. The blurred image of FIG. 7B was processed according to the present invention to provide for the reconstructed image shown in FIG. 7C resulting is high resolution which allows for clear image of the sample. It should be noted that in this particular example the measurement basis of the measured output was the real space, i.e. the same basis as the input field.

The technique of the present invention can be readily extended to two-dimensional sub-wavelength features. It should be understood that the 2D case is physically more challenging, because the scalar relation of Eq. (5) above requires a modification to describe inevitable polarization effects. That is, EM waves containing sub-wavelength 2D optical images cannot be linearly polarized, resulting in a vectorial mapping between real space and the plane-wave spectrum (a unit vector should be added in the integral of Eq. (5)). In this connection, reference is made to FIGS. 8A-8F showing an example containing 2D sub-wavelength amplitude information. These figures describe a scalar version of the physical reality, simply to demonstrate the ability to recover 2D sub-wavelength images.

More specifically, FIGS. 8A to 8F demonstrate the technique of the invention in comparison to the conventional technique for reconstructing 2D objects. FIG. 8A shows a two-dimensional sub-wavelength object to be reconstructed using the technique of the present invention. The 2D spatial Fourier transform of the object is shown in FIG. 8B. FIGS. 8C and 8D show the image of the sub-wavelength object in real space and in Fourier domain, as measured using a conventional optical system. As can be seen, spatial frequencies above the cutoff of the system ($1/\lambda$) are blocked, and therefore the image shown in FIG. 8C is blurred and does not contain the fine details of the original object. FIGS. 5E and 8F show the reconstructed image in real space and in Fourier domain according to the present invention. As shown in FIGS. 8A and 8E (keeping in mind that the position axis in the figures is scaled by the wavelength $1/\lambda$), it is clear that the reconstructed image resolution goes beyond the $1/\lambda$ diffraction limit.

Thus, the invention enables to recover optical information at a resolution exceeding the maximum resolution (defined by a low-pass filter in Fourier space), that can be recovered by direct optical imaging. The techniques of the present invention compensates for the loss of information by taking an advantage of the sparsity of the input information and the transfer function of the optical system (or generally, frequency response function). Given the sparsity of the input information is $\beta$, and the width of the pass-band of the low-pass filter is $\Delta k$, In a noise-free scenario, the present invention could provide for extending the pass-band up to $\Delta k/(2\beta)$. This would amount to extending the pass-band of the transfer function of free-space $H(k_x, k_y)$, from $\Delta k=4\pi/\lambda$ to $\Delta k=4\pi/(2\beta\lambda)$. For very sparse information, $\beta$ can be very small (e.g., in FIG. 1 $\beta=0.03$). This means that the smallest recoverable features in optical microscopy could be as small as $\lambda/16$ or even smaller. Apart from sparsity, another physical limitation is noise, which practically can never be eliminated. The technique of the present invention is rather robust to noise, although noise does reduce its performance. However, the detriment effects of noise can be minimized using over-sampling to increase the precision of the measurements. Using a beam-splitter in the optical system, one could measure simultaneously both the Fourier spectrum and the output image (both after low-pass filtering), and in principle could measure the field distribution in any plane between those. Hence, even though noise will still affect the results somewhat, its detriment effects could be minimized.

As indicated above, the reconstruction technique according to the present invention utilizes sparsity of the input information. The vast majority of natural objects, as well as artificial objects, are sparse. Notwithstanding that, the information does not necessarily have to be sparse in real space, i.e. it can be sparse in any mathematical basis that is sufficiently incoherent with the Fourier basis. Moreover, one can use a mask with random phase (speckles) in the near field right after the object (i.e. phase coding of the input field), which projects more information from the original signal into the low-frequency range, thereby increasing the amount of measurable data.

With regard to sparsity of the image, it should be understood that all natural images are sparse in some known basis.

The simplest examples in optics are images that are sparse in real space, e.g., living cells or bacteria, where the information is only at the contour lines of the various organs, while everywhere else the cell/bacteria is transparent. Preferably, the present invention provides for reconstructing the measured data in the Fourier domain. However, the invention included, as indicated above, the possibility to reconstruct a sparsified version of the original data in a different mathematical basis, which can be realized by a linear transformation.

Figure 9A:
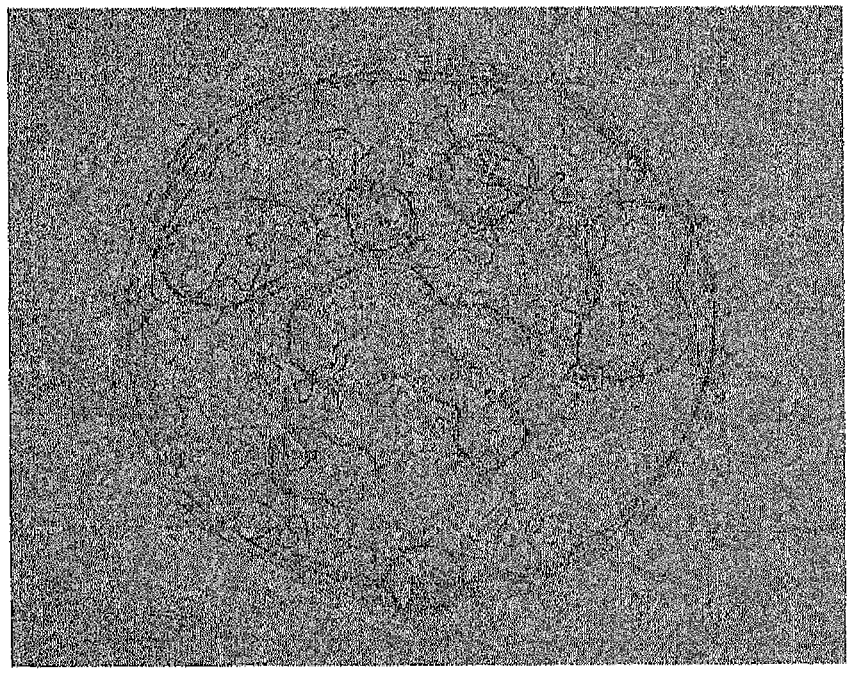
FIGS. 9A and 9B exemplify how the invention can be used for image reconstruction of living cells, being sparse objects.
Figure 9B:
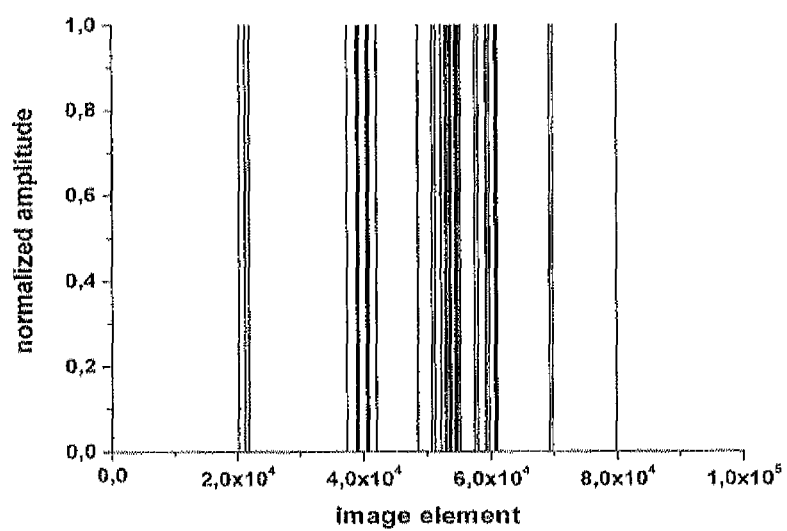
Figure 10A:
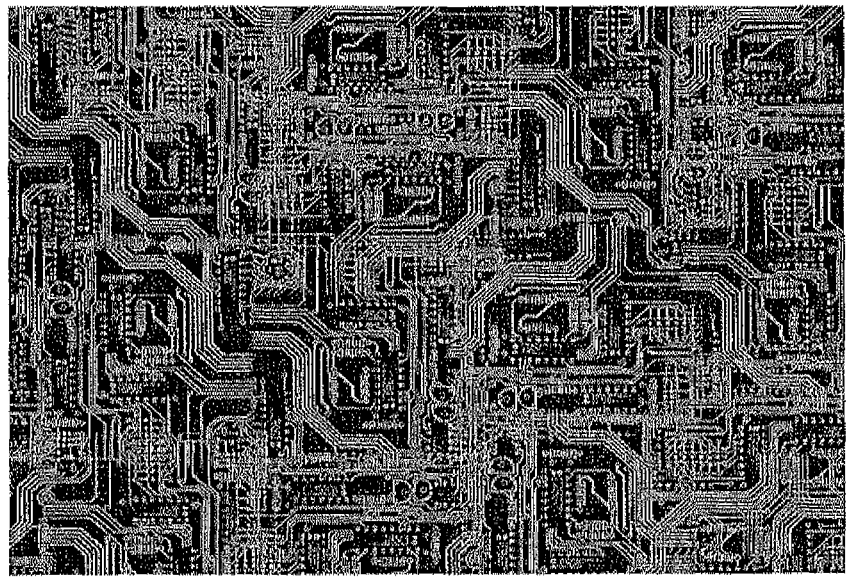
FIGS. 10A and 10B exemplify how the invention can be used for image reconstruction of integrated circuits, being sparse objects.
Figure 10B:
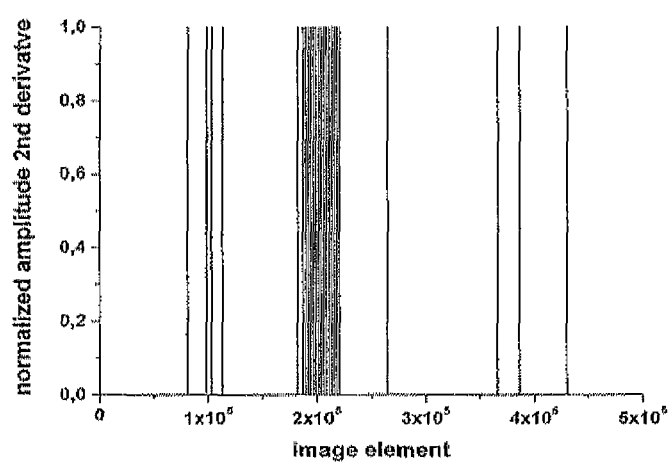

Reference is made to FIGS. 9A and 9B and FIGS. 10A and 10B, showing examples for naturally-sparse (organic cell) and manmade-sparse objects (i.e. the interior of a living bacterium in FIGS. 9A-9B and an integrated circuit in FIGS. 10A-10B). As seen in FIG. 9A, the bacterium/cell spatial features occupy only a small fraction of the area of the cross sections, being therefore highly sparse. FIG. 9B shows the amount of element in the image and the normalized amplitude for each element, thus showing the sparsity of the image. FIG. 10B shows the amount of elements in the second derivative of the circuit shown in FIG. 10A, showing that this image, while being not sparse in real space, is sparse in the space of the second spatial derivative and therefore can also be reconstructed using the present invention. In this case, one reconstructs the second derivative (which is sparse) and recovers from this the original data by an inverse linear transformation.

In both of the above examples, the present invention can provide a major improvement of "looking beyond the resolution limit". Although there are objects that are not sparse, for example, electronic chips, it is clear that sparse objects are not esoteric, but are rather common in very many systems, especially in biological specimen. Finally, it should be noted that the present invention can be applied to every optical microscope as a simple computerized image processing tool, delivering results in almost real time with practically no additional hardware. The technique of the present invention is very general, and can be extended also to other, non-optical, microscopes, such as atomic force microscope, scanning-tunneling microscope, magnetic microscopes, and other imaging systems.

Figure 11A:
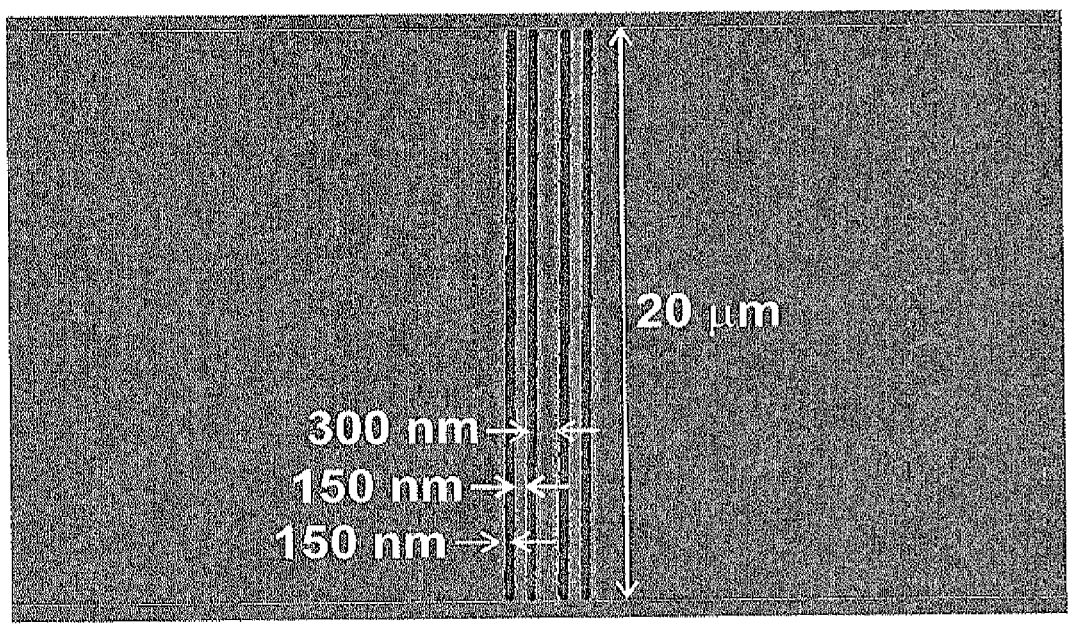
FIGS. 11A to 11J compare the use of the invention and the conventional technique for sub-wavelength image reconstruction.
Figure 11B:
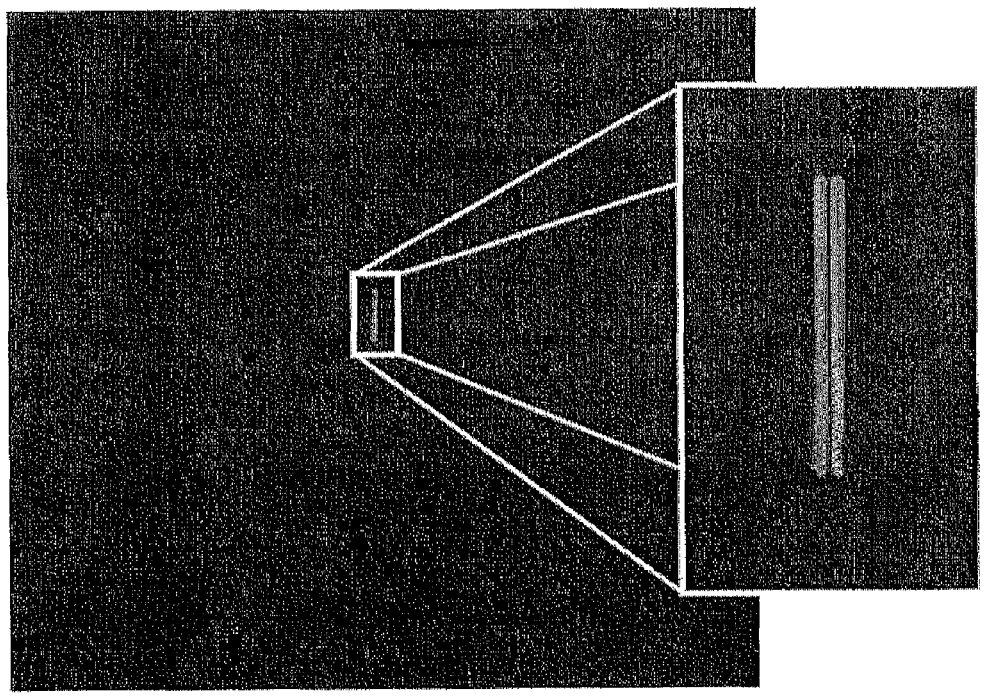
Figure 11C:
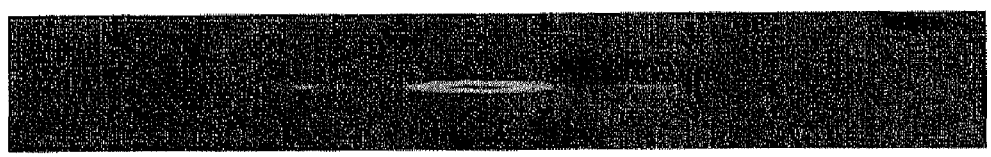
Figure 11D:
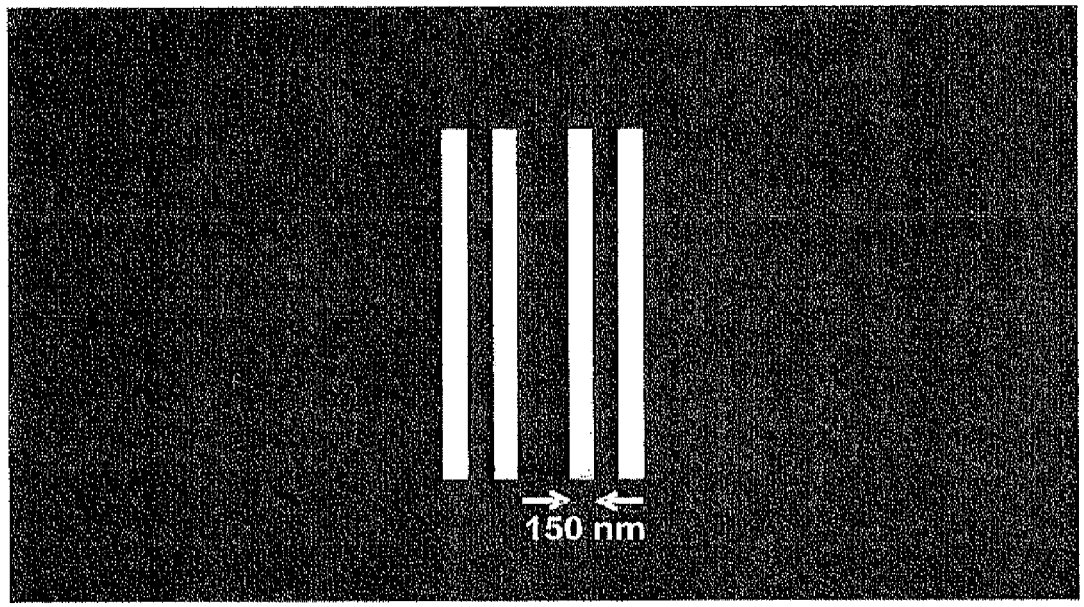
Figure 11E:
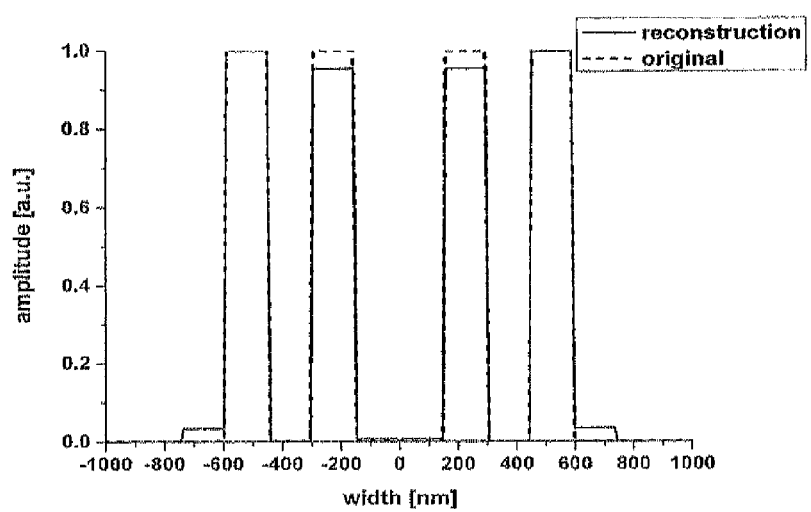
Figure 11F:
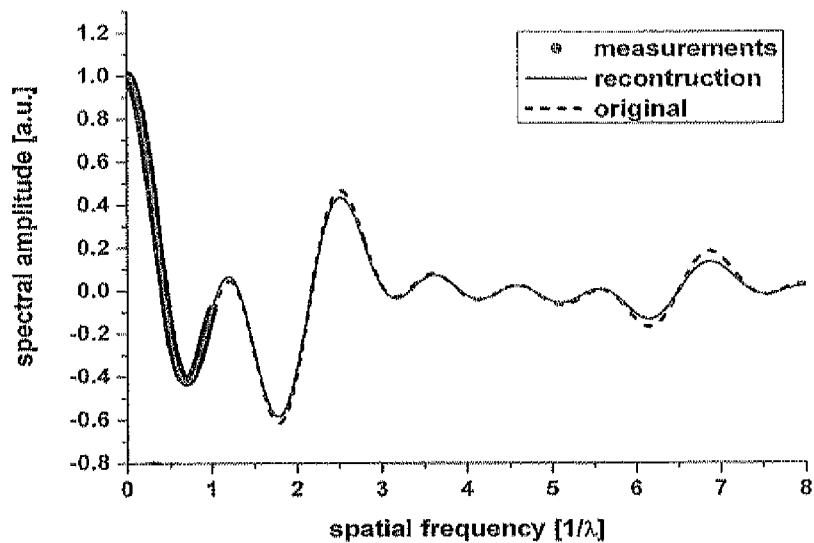
Figure 11G:
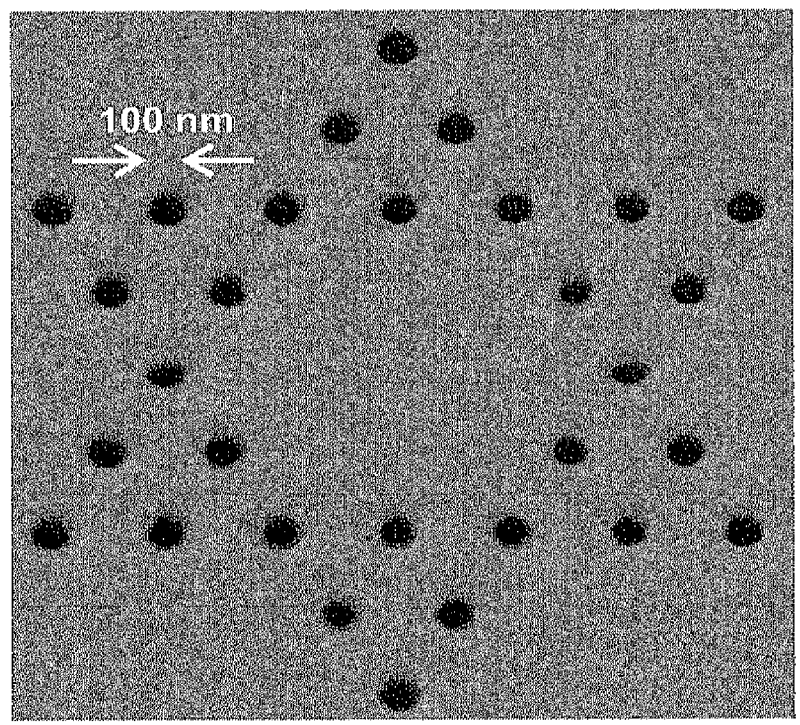
Figure 11H:
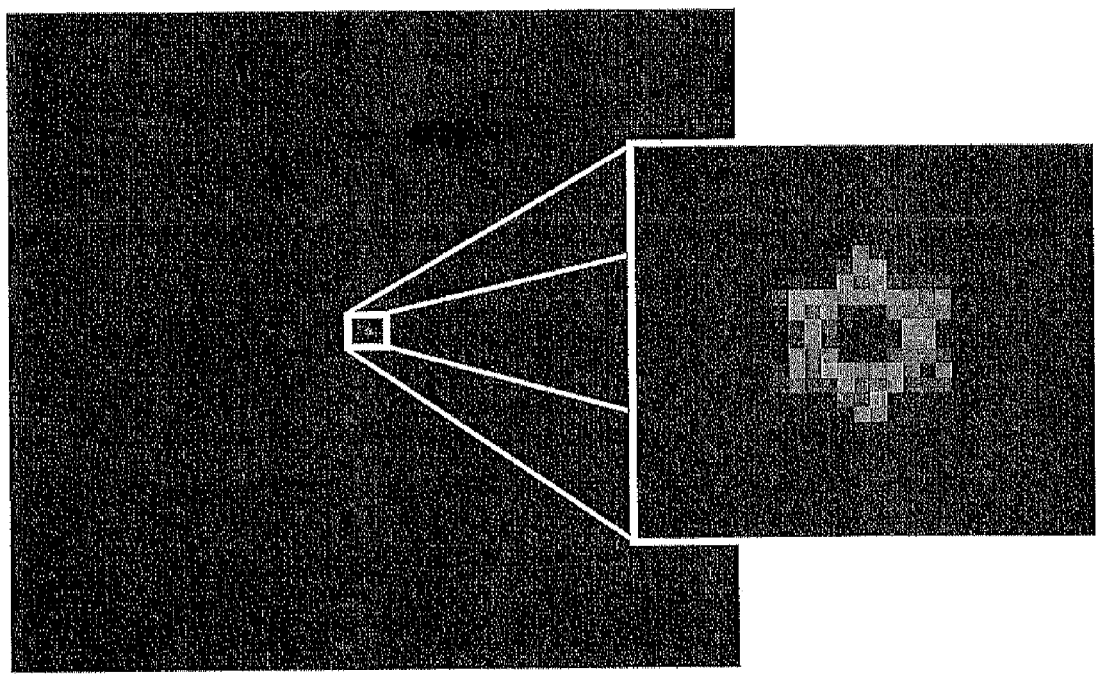
Figure 11I:
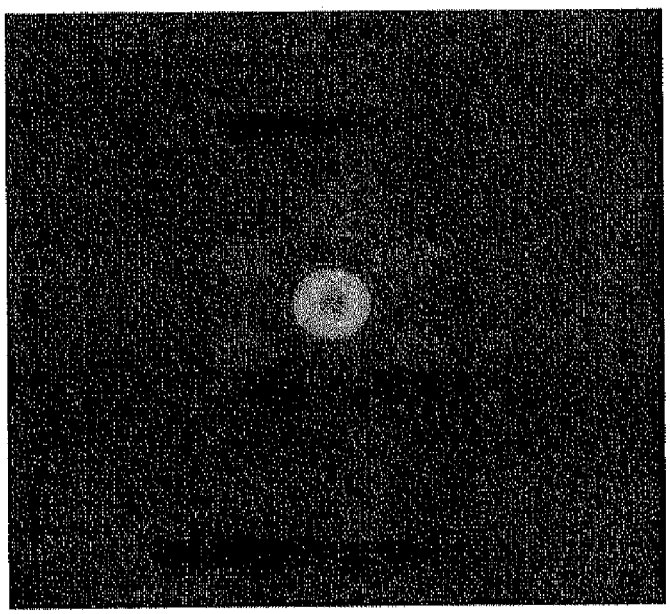
Figure 11J:
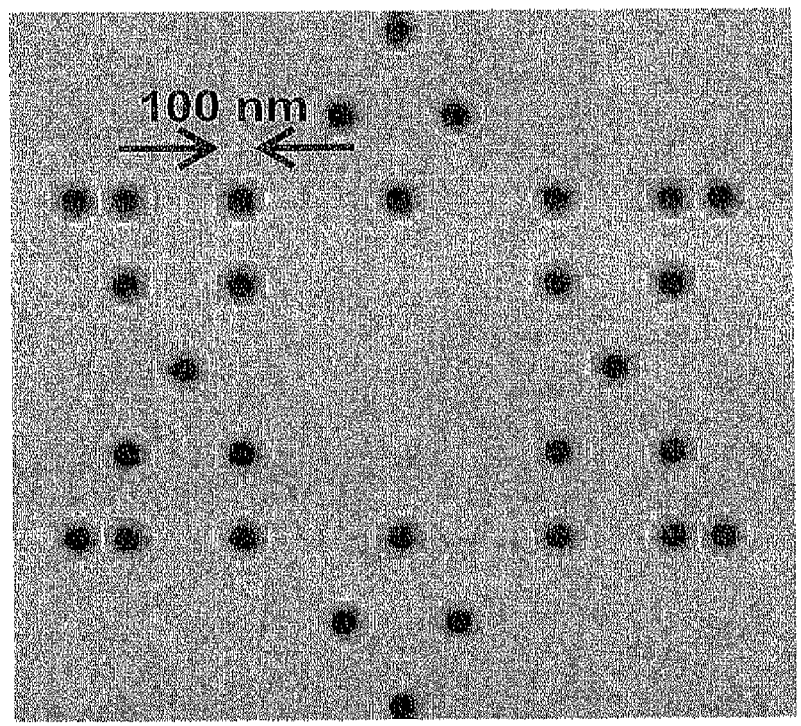

The following are some more examples of the technique of the present invention for image reconstruction as compared to the conventional reconstruction technique. Reference is made to FIGS. 11A-11J. Here, FIG. 11A shows a scanning microscope image of sub-wavelength slits in a metal plate. Optical imaging of this object is shown in FIG. 11B, where an illuminating wavelength of $\lambda=532$ nm was used, presenting low quality image because each of the pair of slits presented in FIG. 11A cannot be spatially separated in the image. The spatial cutoff Fourier spectrum of the object of FIG. 11A is shown in FIG. 11C, which also represents the measured data. FIG. 11D shows reconstructed image of the sub-wavelength object, resulting from the technique of the invention, where all slits are seen to be well separated from one another. It should be noted that the width of the slits (150 nm) is well below the optical wavelength ($\lambda=532$ nm). In FIG. 11E, a comparison between a cross section of the original and the recovered sample is shown. The recovered spectrum is shown in FIG. 11F, demonstrating a recovery of spatial frequencies 8 times larger than the cutoff frequency imposed by the CTF. A two-dimensional application of the reconstruction technique is presented in FIGS. 11G-K. FIG. 11G shows a Reflection Electron microscope (REM) image of the sample, with feature size of 100 nm. When illuminating the sample with light at $\lambda=532$ nm, in a microscope the image is highly blurred and all the sub-wavelength information is lost (FIG. 11H). The spatial cutoff Fourier spectrum of the object of FIG. 11G is shown in FIG. 11I, which also represents the measured data. FIG. 11J shows reconstructed image of the sub-wavelength object, resulting from the technique of the invention, where all slits are seen to be well separated from one another. Note that the width of the slits (100 nm) is well below the optical wavelength ($\lambda=532$ nm).

The reconstruction technique of the present invention can be also applied to recovering the waveform of optical pulses, when measured with a detector much slower than the duration of the optical pulse, i.e. the rise time of the detector is larger/longer than the pulse duration). In mathematical terms, the response function of the measurement system exhibits a cut-off for high temporal frequencies (i.e. it is a slow detector), and one wants to reconstruct the high frequencies of the optical pulse from a measurement of the low frequencies solely. This problem is hence very similar to the sub-wavelength imaging.

Figures 12A, 12B, 12C, 12D, 12E, 12F, 12G, 12H, 12I, 12J:
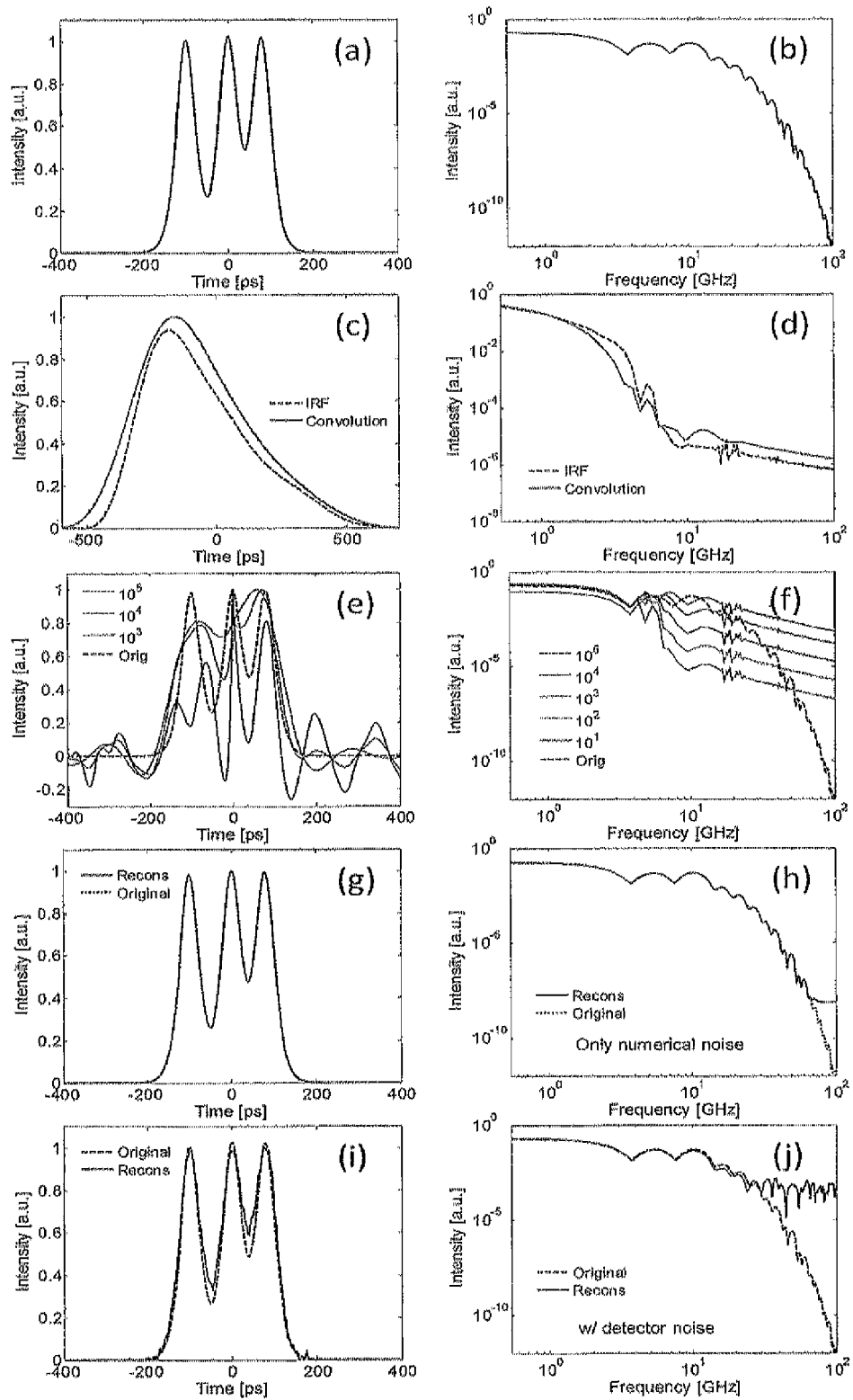
FIGS. 12A to 12J exemplify how the invention can be used for reconstructing the shape of temporal optical pulses using a slow detector.

Reference is made to FIGS. 12A-12J, where a numerical example of reconstructing a short pulse using a slow detector is illustrated. An intricate pulse, which consists of three 30 pico-seconds sub-pulses, is presented in FIG. 12A (time domain) and FIG. 12B (spectral domain). FIG. 12C shows a numerically detected signal that is calculated through convolution between the pulse and an impulse response function, which is also shown in the figure. The associated spectral transfer function and signal spectrum are shown in FIG. 12D. The impulse response function in FIG. 12C corresponds to the true experimentally-measured impulse response function of a photodiode with 1 nanosecond rise time (corresponding to cutoff frequency $f_c$~0.3 GHz). FIGS. 12E and 12F show attempts to reconstruct the original pulse using Wiener de-convolution for wide range of the Wiener de-convolution SNR-parameter. Evidently, the de-convolved waveforms (FIGS. 12E and 12F) are distorted significantly. Using the reconstructing method of this invention, on the other hand, the inventors show they are able to extract the original pulse at extremely high-resolution (FIGS. 12G and 12H). FIG. 12H shows that data at the entire spectral region up to 93 GHz is recovered very accurately. In comparison, the 'transition frequency' in the de-convolution case (FIG. 12F) is more than 10 times smaller. In FIG. 12J, the reconstructed waveform from the convolved signal (FIG. 12C) with additional white Gaussian noise at SNR=$10^5$ is shown, demonstrating the robustness of the sparseness-based recovering algorithm. FIGS. 12A-12J thus exemplify that the reconstruction algorithm presented in this invention can increase the resolution in waveform reconstruction of short pulses by at least an order of magnitude.

Figures 13A, 13B, 13C, 13D, 13E, 13F, 13G:
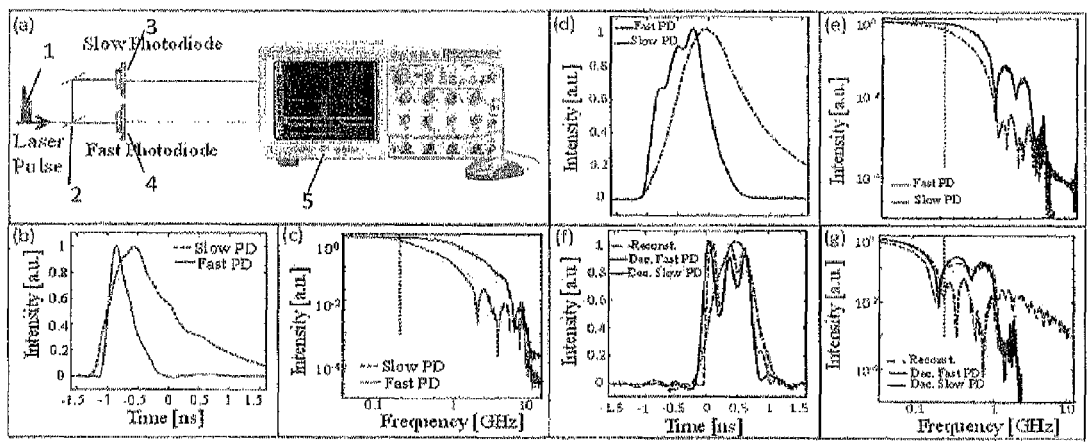
FIGS. 13A to 13G show experimental results and compare the use of the invention and the conventional technique for reconstructing the shape of temporal optical pulses using a slow detector.

FIGS. 13A to 13G show an experimental demonstration of the technique for waveform reconstruction of short optical pulses that are detected by a photodiode. FIG. 13A illustrates an experimental measurement system for inputting a laser pulse 1, passing it through a beam splitter 2, and detecting spatially separated light components emerging from the beam splitter by respectively a slow photodiode pulse detector 3 (having a rise time of 175 pico-seconds) and a fast photodiode pulse detector 4 (having a rise time of 150 pico-seconds). A control unit 5 having an appropriate processor utility is provided in communication with the measurement system. Thus, a laser pulse that consists of three 150-picoseconds sub-pulses is detected by a "slow" photodiode with 1 nanosecond rise time, and for comparison, the pulse is also probed with a "fast" photodiode (175 picoseconds rise time).[0] One first measures the photodiode impulse response and spectral transfer functions by detecting a 30 fs pulse, which acts as "impulse excitation" and yields the impulse response of the detector. FIG. 13B shows the impulse response functions of the photodiodes in the temporal domain, and FIG. 13C shows the impulse response functions in Fourier domain. FIG. 13D shows a measurement by the slow and fast photodiodes, Slow PD and Fast PD, while their Fourier spectra are shown in FIG. 13E. The reconstruction scheme was implemented on the detected signal using the "slow" photodiode and attained a good-quality reconstruction, as shown in FIGS. 13F, 13G, which also show Wiener de-convolution using the same output signals from the "slow" and "fast" photodiodes. More specifically, three graphs are shown, corresponding to de-convolution based reconstruction of measured data of slow photodiode, Dec. Slow PD, the same reconstruction of measured data from fast photodetector, Dec. Fast PD, and to reconstruction of the measured data of the slow photodiode by the technique of the present invention, Reconst. FIG. 13G shows the similar graphs (reconstructed signals) in Fourier domain. Clearly, sparsity-based reconstruction method succeeds to extract the correct three-pulse structure whereas Wiener de-convolution totally fails. FIG. 13 G shows that Wiener de-convolution reconstructs the spectrum up to the cutoff-frequency, while the sparsity-based method is able to reconstruct the data at ~10 times higher resolution and employs the prior information to retrieve the data that is otherwise hidden in the noise.

Figure 14A:
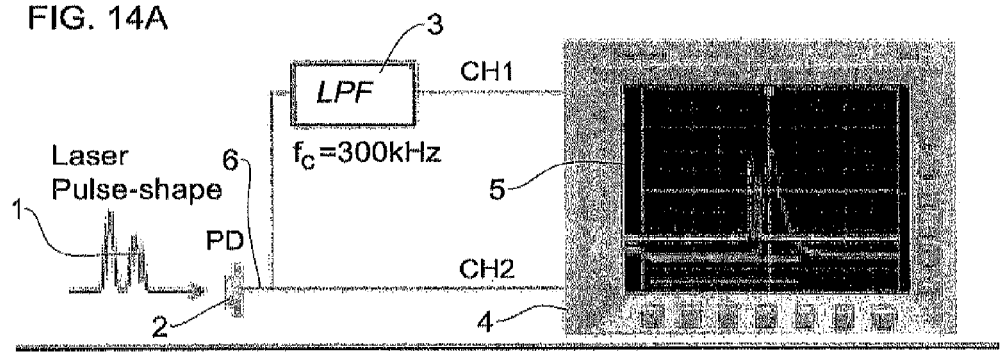
FIGS. 14A to 14G illustrate a possible setting for reconstructing the shape of temporal optical pulses using a slow detector.
Figures 14B, 14C:
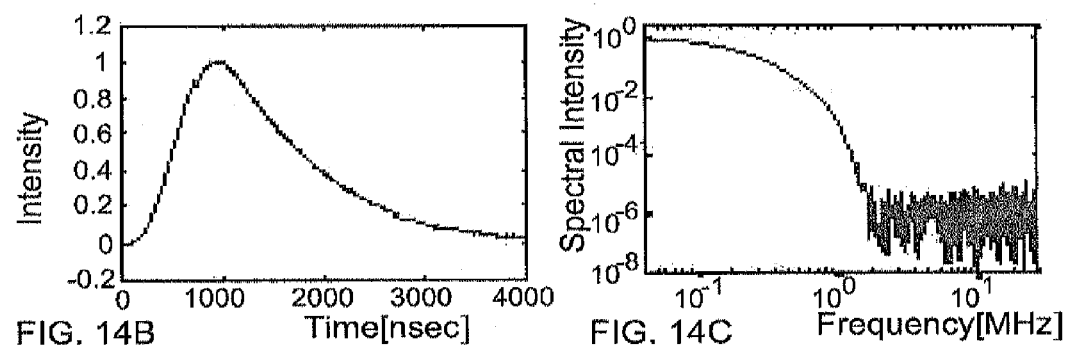
Figures 14D, 14E:
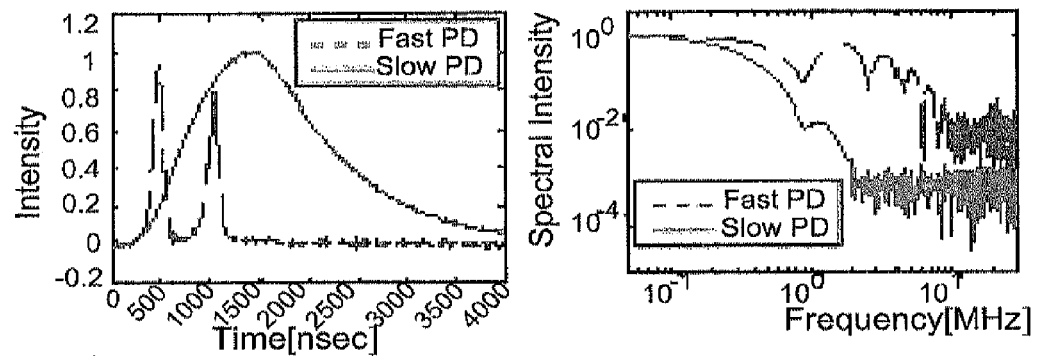
Figures 14F, 14G:
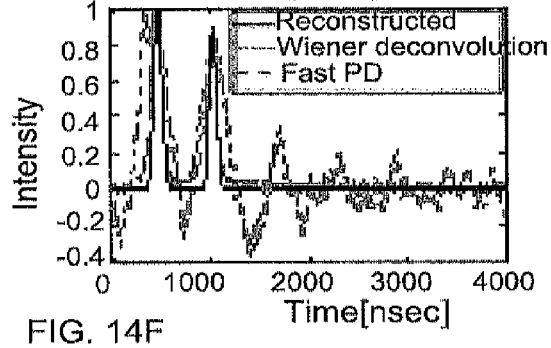

Reference is made to FIGS. 14A to 14G, where an implementation of the invented reconstruction scheme is shown for recovering the waveform of electronic pulse that was filtered by an electronic low pass filter (LPF). FIG. 14A shows an experimental system for measuring an electronic signal (pulse) created by illuminating a photodiode 2 with an optical pulse (laser pulse) 1. Here, the photodiode has a rise time of 1 nano-second while the laser pulse 1 has a duration defined by a sequence of two sub-pulses with FWHM (Full Width at Half Maximum) of 120 nano-seconds and a peak separation of 550 nanoseconds. Thus, the rise time of the photodiode is much shorter than the duration of each sub-pulse, and according the photodiode output is practically identical to its input. The electronic output of the photodiode 2 presents an input signal 6 for the experimental measurement system, i.e. this input signal is measured and reconstructed. As shown, the input signal 6 is probed by a fast oscilloscope 5 (constituting a short rise-time detector) through two channels, one after passing through a low pass filter (LPF) 3 with $f_c$=300 KHz (i.e. rise time much longer than the sub-pulse duration), and the other is through an unfiltered input channel 4 of the oscilloscope 5. Thus, a complex electronic pulse is produced by illuminating the photodiode with 1 ns rise time by a laser pulse that consists of two sub-pulses with FWHM of 120 ns and a peak separation of 550 ns. The photodiode is probed by the fast oscilloscope through electronic LPF with $f_c$=300 KHz. For comparison, the photodiode is also probed directly. One first measures the impulse response and spectral transfer functions of the LPF by illuminating the photodiode with a 10 ps pulse. FIGS. 14B and 14C show the impulse response function of the LPF in temporal and in Fourier domains respectively. FIG. 14D shows a single-shot measurement directly (Fast PD, unfiltered) and through the LPF (Stow PD, filtered) whereas their Fourier spectra are shown in FIG. 14E. The reconstruction scheme is implemented on the detected signal through the LPF and attained a high-quality reconstruction of the waveform (FIG. 14F). This result is compared to a Wiener de-convolution. More specifically, FIGS. 14F and 14G show, in temporal and Fourier domains respectively, the reconstructed signals including the signal reconstruction according to the technique of the present invention (Reconstructed) and the signal reconstructed using the de-convolution technique (Wiener de-convolution), in comparison to the measurement of the unfiltered channel (Fast PD, unfiltered).

As shown, the reconstruction method proposed in this invention significantly exceeds the accuracy of the Wiener de-convolution. Notably, comparison between FIGS. 14E and 14G demonstrates that the proposed reconstruction technique is capable of recovering information at spectral regions in which the signal is completely submerged in the noise.

Notable, in the temporal case, the measured data is taken in an intermediate basis, which is neither the time—nor the frequency basis.

Figure 15A:
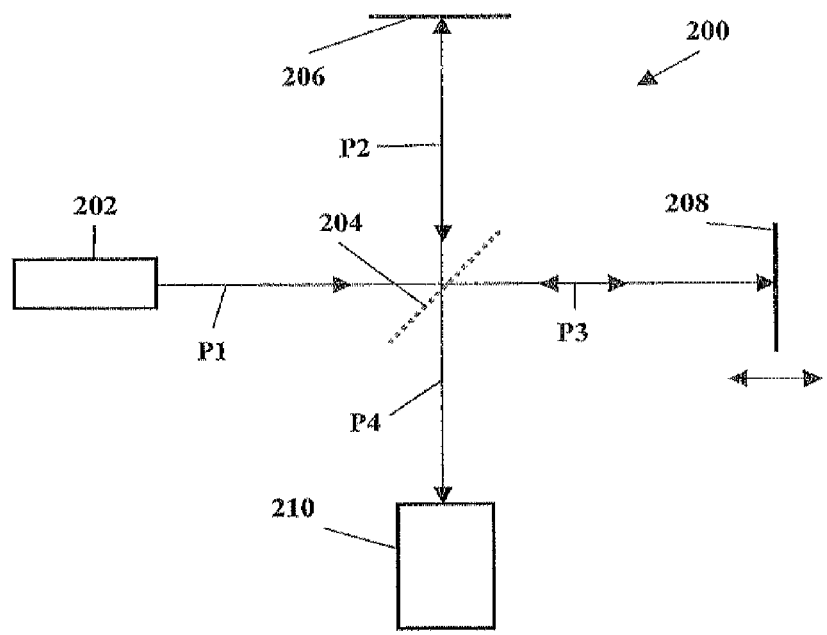
FIGS. 15A to 15C illustrate a Fourier transform infrared (FTIR) spectrometer system and resulting spectral features of a measure light beam, FIG. 15A show the measurement system, FIG. 15C show Fourier transform of a measured beam spectrum and FIG. 15C show the detected spectral features of the measured beam.
Figure 15B:
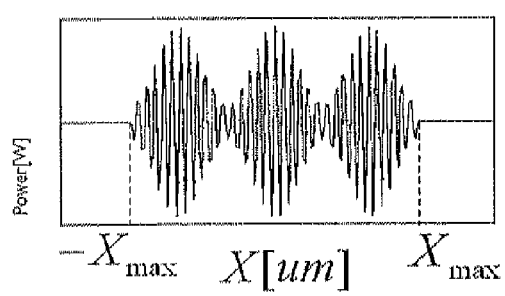
Figure 15C:
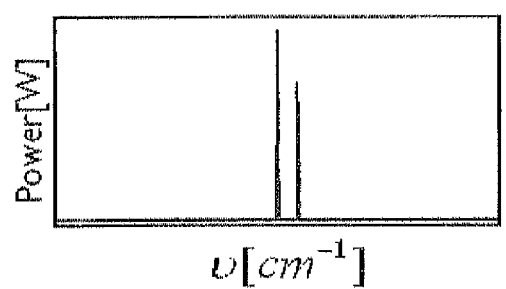

As indicated above, the technique of the present invention may also be utilized for recovering spectral features at a resolution exceeding the resolution limit of the measurement apparatus. Reference is now made to FIGS. 15A-15C exemplifying a use of the technique of the present invention for spectrometric measurements in an interferometer based system. FIG. 15A illustrates a Fourier Transform Infrared (FTIR) spectrometer system 200 used for obtaining spectral features of a light source by self-interference (interferogram). FIGS. 15B and 15C show respectively the measured interferogram of a light source measured by system 200 and the spectral features of the beam calculated from said Fourier transform results. A light source 202 is directed toward a beam splitter 204 which splits beam P1 to produce reference and signal beams P2 and P3 respectively; a first portion of the beam P2 being a reference beam is directed to a first reflective surface 206 which reflects it back to the beam splitter 204; while a second portion P3 of the beam continues towards a second reflective surface 208 and is reflected back to the beam splitter 204. Typically, one of the reflective surfaces undergoes controllable movement along the beam propagation axis to introduce controllable (known) delay; in this example surface 208 is a movable reflective surface. In some applications, one of the reflective surfaces may constitute a sample under inspection; in some other applications the spectral properties of the laser beam itself are to be studied.

Both beam components are recombined at the beam splitter 204 wherein the beam components have a temporal delay relative to each other, depending on the location of the movable mirror 208 corresponding to the time of interaction (re-combining) between the beams at the beam splitter 204. The two beam components interfere and a resulting optical beam P4 is collected and measured by a detector 210. Repeating this measurement with the second (movable) mirror 208 at successive different locations can provide a Fourier transform of the initial beam P1 (shown in FIG. 15B) which can be later inverted to provide the spectral features of the initial beam P1 (FIG. 15C).

To this end, measured data generated by a spectrometer system 200 of the type shown in FIG. 15A is typically a truncated interferogram, which is limited in the detection frequency due to limited retardation of the movable mirror 208. The maximal retardation distance of mirror 208, in both directions, results in an effective response function of the system having a cutoff at the maximal retardation distance $X_{max}$ (as shown in FIG. 15B). If the measured signal includes features of frequency which correspond to a larger retardation distance, such features will be non-detectable using the standard interferometric techniques.

Figure 16A:
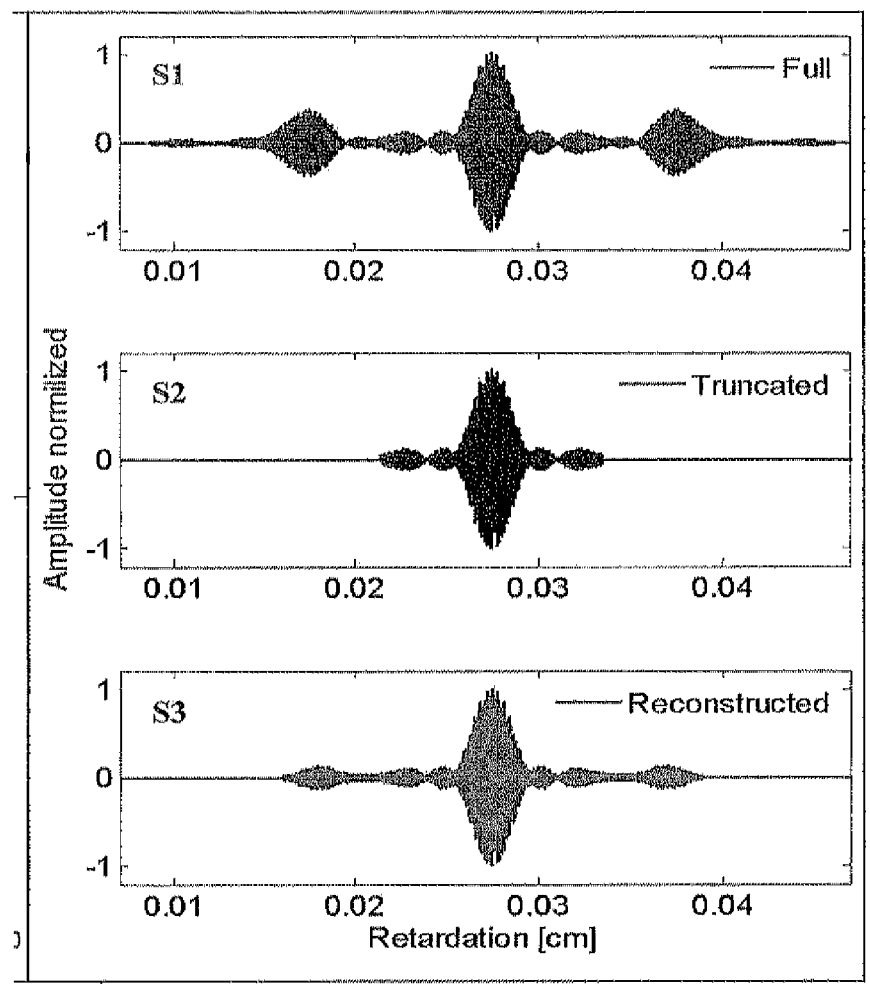
FIGS. 16A and 16B show full, truncated and reconstructed interferograms obtained by FTIR system and corresponding spectral features of a measured beam respectively.
Figure 16B:
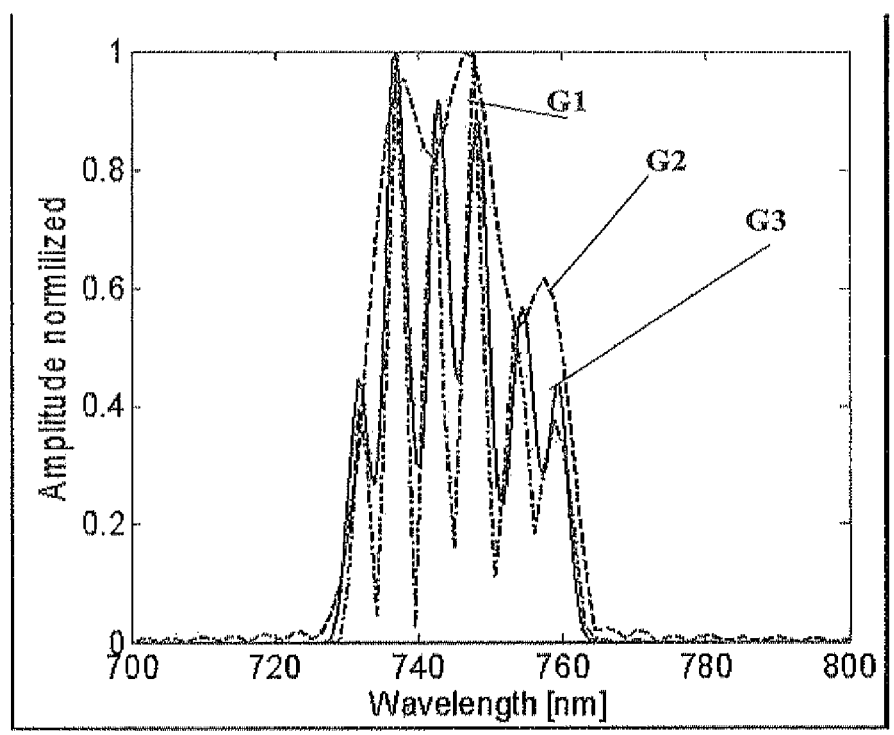

FIGS. 16A and 16B show experimental results of FTIR spectrometer measurements using the above described measurement system operable with a maximal retardation distance of 0.5 mm in steps of 0.2 μm, and the reconstructed signal utilizing the technique of the present invention. It should be understood that the maximal retardation distance of such a system actually defines the maximal spectral resolution of the detector, while the minimal retardation step corresponds to the maximal frequency that can be detected. FIG.

16A shows three interferogram graphs: graph S1 shows a full, measured interferogram of a certain input signal; graph S2 shows the truncated interferogram measured by "another" FTIR system (having lower maximal retardation distance); and graph 53 shows the reconstructed interferogram produced by the technique of the present invention. FIG. 16B shows the signal spectrum as received by Fourier transform of the above shown interferograms, graph G1 shows the full, calculated, spectrum (corresponding to S1 of FIG. 16A); graph G2 is the spectrum received from the truncated interferogram measurement S2; and graph G3 is the reconstructed spectrum (corresponding to graph S3). It can be easily seen that significant information is lost in the spectrum calculated from the truncated interferogram G2 (corresponding to S2). The truncated interferogram S2 is then used for reconstructing the original signal using the technique of the invention as described above, assuming the spectrum is sparse in the basis of shifted Gaussians. As can be seen from the figure, the reconstructed spectrum G3 includes all the main features of the full spectrum G1.

The choice of appropriate basis for reconstruction of a sparse signal according to the invention can be based on prior assumption on physical properties of the measured signal. However, at times such prior physical assumptions may not be sufficient and the appropriate basis is to be chosen from a family of bases (which may be infinite or not).

Thus, the technique of the present invention can find an appropriate basis, in which the input field is sparse, from a family of bases. To this end, with reference back to FIG. 1, the field related data FD, may include data indicative of a family of bases, wherein the input field IF is assumed to be sparse in at least one basis of said family, and is typically sparse in several bases at different levels. The processor utility 14, and more specifically the sparse vector determination module 14A, may be configured and operable to identify a basis suitable for signal reconstruction out of said family of bases. The suitable basis is selected in accordance with the measured output MO prior to determination of the sparse vector. It should be noted that there may be several suitable bases and the selected basis is chosen as one of a set of appropriate bases.

An example for such a family of bases may be a set of Gauss-Hermite functions, i.e. each unit vector is defined as an appropriate Hermite polynomial multiplies by a Gaussian of a certain width and around a certain location as follows:

$$H_n(\lambda)e^{\left[-\frac{(\lambda-\lambda_0)^2}{\Delta\lambda^2}\right]}$$

Here, $H_n(\lambda)$ is the $n^{th}$ Hermite polynomial; $\lambda_0$ defines a point in the space around which the basis functions are centered; and $\Delta\lambda$ defines the width of the basis functions. It should be noted that the present example is described with relation to spectrometry application and thus the basic variable is given as $\lambda$ defining wavelength of the input signal. However this example should be interpreted broadly to define the technique for any type of bases family including, but not limited to, shifted Gaussians, shifted Lorentians, shifted Delta functions; and bases families more suitable for sub-wavelength imaging such as shifted sinc functions, shifted circles, squares etc.

To this end, a family of bases typically includes a number of bases (being infinite or not) different from each other by one or more parameters. In the case of Gauss-Hermite functions there are two such parameters, however the number of free parameters may differ in accordance with mathematical and/or geometrical properties of the basis. The sparse vector determination module 14A operates to identify the optimal basis by projecting the measured field (MO) on the different bases of the family to identify the basis in which said measure field is the most sparse. For example, in the case of Gauss-Hermite polynomials the measured field can be presented as follows:

$$MO(\lambda) = \sum_n a_n H_n(\lambda)\exp\left[-\frac{(\lambda-\lambda_0)}{\Delta\lambda^2}\right]$$

The inventors have found that the optimal basis (defined by the parameters $\lambda_0$ and $\Delta\lambda$) is the basis in which the coefficients vector $\{a_n\}$ is the most sparse. The sparse vector determination module 14A may operate to identify the appropriate basis by either L1 or L0 minimization of the coefficients vector $\{a_n\}$ as the case may be. The inventors have found that the basis in which the measured field is the most sparse is in many cases substantially similar to the optimal basis in which the input field is the most sparse. It should be noted that L1 norm of a vector is the sum of absolute value of its components while L0 norm of a vector is the number of its components which are non-zero.

Figure 17A:
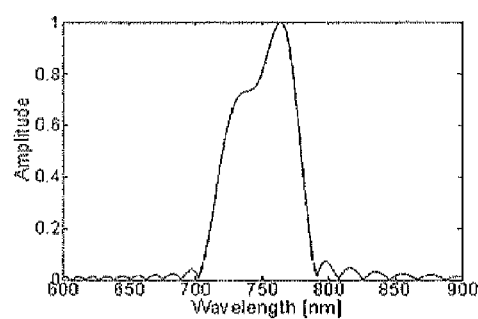
FIGS. 17A to 17D illustrate a truncated (measured) input field, a projection map of the truncated field on a bases family and a corresponding original and reconstructed to fields and their corresponding projection map respectively.
Figure 17B:
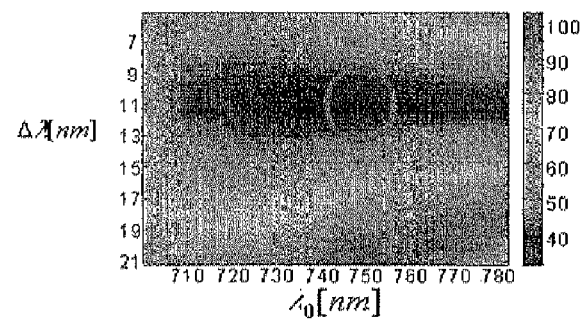
Figure 17C:
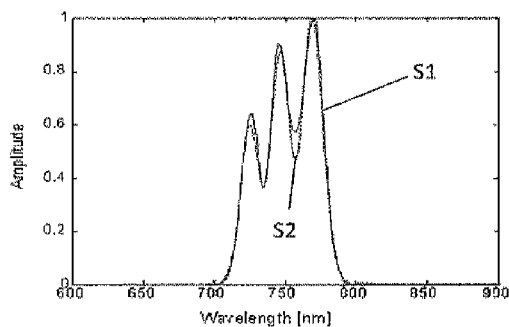
Figure 17D:
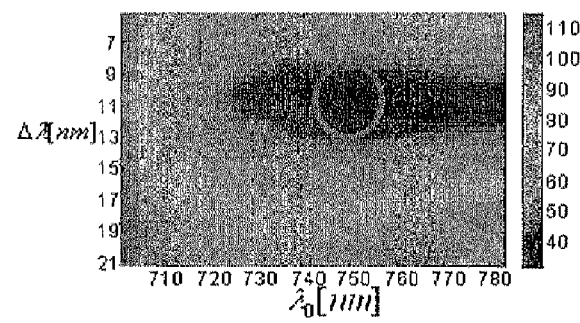

Reference is made to FIGS. 17A to 17D illustrating some aspects used in the invention with regard to the connection between the appropriate basis with respect to the measured field and the appropriate basis with respect to the input field. FIG. 17A shows Fourier transform of measurement obtained by an FTIR spectrometer having limited retardation distance as shown in FIG. 15A; FIG. 17B illustrates a map of L1 norm of the projection vector of the measured spectrogram onto Gauss-Hermite functions with different $\lambda_0$ and $\Delta\lambda$ parameters; FIGS. 17C and 17D show the source and the reconstructed spectra (S1 and S2 respectively) and a map of L1 norm of the projection vector corresponding to the source spectrum on the same Gauss-Hermite function respectively. In both FIGS. 17B and 17D, a circle is shown marking a region in the projection map corresponding to bases in which L1 of the spectrum projection is minimal. As can be seen from these figures the minimal L1 norm is obtained for substantially the same basis functions. The inventors have also found that a substantially similar result can be obtained by choosing a basis in which L0 norm of the projection vector is minimal. It should be noted that such similarity between the sparsity of the truncated/measured field and the original input field and the corresponding basis is typically limited to conditions in which the measurement device (e.g. FTIR) measures the overall size of a supported signal (e.g. spectrum) quite accurately.

It should be noted that different bases families may differ in the number of free parameters defining the different bases in the family. For example, the bases family of shifted Lorentians is defined by:

$$L(x, x_0) = \frac{1}{\pi}\frac{1/2W}{(x-x_0)^2 + (1/2W)^2}$$

Such bases family have only one free parameter which is the width of the Lorentians (W). In imaging application an appropriate basis for reconstruction may be Fourier transform of the image as indicated above, or other such bases. Additionally a sparse image may be reconstructed utilizing other basis such as shifted circles, shifted rectangles, or shifted triangles, all placed on a predetermined grid defining a geometrical resolution of the reconstructed image.

It should be noted that as the reconstruction process is typically a digital process, the reconstructed field may be characterized by a certain geometrical resolution, i.e. basis functions may be arranged on a predetermined grid or calculated with respect to a predetermined temporal clock. It should also be noted that such predetermined geometrical resolution is not limited by any type of response function of a measurement system. However the resulting geometrical resolution may be dependent on the accuracy of measured field within the bandwidth of the measurement system. Moreover, the inventors have found that the exact choice of grid for field reconstruction according to the present invention has only limited effect on the accuracy of the reconstruction.

Thus, the present invention provides a simple and effective super-resolution (e.g. sub-wavelength resolution) reconstruction of various types of signals, which technique is practically very useful for most measurement applications. These include optical applications (sub-wavelength imaging; detection of optical pulses by "slow" detectors) utilizing signals of uniform or non-uniform phase; electronic applications for measurement of electric signals; as well as applications where an input signal is to be reconstructed from measured data corresponding to its interaction with one or more other reference signals. Those skilled in the art will readily appreciate that various modifications and changes can be applied to the embodiments of the invention, as herein before exemplified without departing from its scope defined in and by the appended claims.

The invention claimed is:

1. A method for reconstructing an input field sensed by a measurement system, the method comprises:
   providing measured data corresponding to output field of said measurement system;
   providing data about sparsity of the input field, and data about an effective response function of the measurement system; and
   processing the measured data based on said data about sparsity of the input field and about the effective response function, the processing comprising:
   determining a sparse vector as a function of said measured data, said data about the sparsity of the input field, and said data about the effective response function; and
   using the sparse vector for reconstructing the input information.

2. A method according to claim 1, wherein the input field is reconstructed with resolution above an effective cutoff of said effective response function.

3. A method according to claim 1, wherein said input signal is an optical field.

4. A method according to claim 1, wherein the measurement unit comprises an optical imaging system.

5. A method according to claim 4, wherein the input field corresponds to coherent illumination during imaging, the effective response function being associated with a Coherent Transfer Function (CTF) of the measurement system.

6. A method according to claim 4, wherein the input field corresponds to incoherent illumination during imaging, the effective response function being associated with Optical Transfer Function (OTF) of the measurement system.

7. A method according to claim 4, wherein the input field corresponds to partially-incoherent illumination during imaging, the effective response function being associated with relation between the input field and the measured data.

8. A method according to claim 4, wherein said reconstructed input field has resolution corresponding to features smaller than a diffraction-limited spot of the imaging system.

9. A method according to claim 4, wherein the measurements are taken in the far-field plane of the input field.

10. A method according to claim 4, wherein the measurements are taken in the image plane of the input field.

11. A method according to claim 4, wherein the measurements are taken in any arbitrary plane of the input field, provided that the relation between the measurement plane and the input plane is known.

12. A method according to claim 1, wherein the input field comprises one or more pulse signals, the reconstruction of the input filed comprises reconstructing a profile of each of said one or more pulse signals.

13. A method according to claim 12, wherein the measurement system comprises a detector having the effective response function corresponding to a temporal frequency response.

14. A method according to claim 12, wherein the temporal frequency response defines a rise time of the detector longer than duration of each of said one or more pulses.

15. A method according to claim 1, wherein the input field comprises an optical spectrum of light, the reconstruction of the field comprising identifying a spectral profile of said beam.

16. A method according to claim 15, wherein the measurement system is a spectrometer, said effective response function being associated with maximal retardation distance or photon lifetime of said spectrometer.

17. A method according to claim 1, wherein said providing of the data indicative of sparsity of the input field comprises a basis in which said input field is sparse.

18. A method according to claim 1, wherein said providing of the data indicative of sparsity of the input field comprises providing data about a family of bases, and determining a suitable basis in which said input field is sparse.

19. A method according to claim 1, wherein said providing of the data indicative of sparsity of the input field comprises transforming the input field into sparse representation thereof in certain known basis.

20. A method according to claim 1, wherein the input field is sparse in a domain connected to Fourier domain by linear or non-linear transformation.

21. A method according to claim 18, wherein the input field is sparse in real space measured in a Fourier domain.

22. A method according to claim 18, wherein the input field is sparse in a second derivative domain measured either in a Fourier domain or in real space.

23. A method according to claim 1, wherein said data indicative of sparsity of the input field has a matrix representation of the basis in which said signal is sparse.

24. A method according to claim 1, wherein said input field has a non-uniform phase 25. A method according to claim 1, wherein said determination of the sparse vector comprises non-local hard thresholding of the output field.

26. A method according to claim 25, wherein said non-local hard thresholding comprises allocating off-support elements of the sparse vector, said allocating comprising zeroing out each element of the sparse vector which is below a fixed threshold along with its neighbors.

27. A method according to claim 1, wherein said processing comprises an initial decoding of the measured data.

28. A method according to claim 12, wherein the measurement system comprises a detection unit including at least one of the following signal detectors: oscilloscope, photodiode, streak camera, frequency resolved optical gating (FROG), Spectral Interferometer for Direct E-field Reconstruction (SPIDER), Cross-correlation Frequency resolved optical gating (XFROG), GRENOUILLE, and TADPOLE.

29. A method according to claim 12, wherein the measurement system is configured for carrying out at least one of the following: cross correlation of an input signal with a reference signal, the input field being a result of said cross correlation; and auto correlation of an input signal with itself, the input field being a result of said autocorrelation.

30. A method for reconstructing an input field sensed by a measurement system, the method comprises: providing measured data corresponding to output field of said measurement system; providing data about sparsity of the input field, and data about effective response function of the measurement system; and processing the measured data based on said data about the sparsity and about the effective response function to reconstruct the input field with resolution above an effective cutoff of the effective response function.

31. A system for reconstructing an input field, the system comprising:
at least one input port for receiving measured data corresponding to an output signal generated by a certain measurement system in response to said input field; and
for receiving data indicative of the sparsity of the input field, and data indicative of the effective response function of said measurement system; and
a data processor utility which is preprogrammed for analyzing and processing the received data to determine a sparse vector which is a function of said measured data, said data about sparsity of the input signal, and said data about the effective response function, and use the sparse vector to reconstruct the input signal by base transformation of the sparse vector onto the original base of the input field.

32. A system according to claim 31, wherein the data processor utility is configured and operable for transforming the input field into sparse representation thereof in certain known basis.

33. A system according to claim 31, wherein said reconstructed input field has a resolution higher than an effective cutoff frequency of said effective response function.

34. A system according to claim 31, wherein said data processor utility is configured for identifying whether the input field has uniform or non-uniform phase.

35. A system according to claim 31, wherein said input field is an optical field, the output field corresponding to an image of the input field.

36. A system according to claim 35, wherein the output field corresponds to far field image of the input field.

37. A system according to claim 31, wherein said reconstructed input field has features smaller than the diffraction-limited spot of the imaging system.

38. A system according to claim 31, wherein said data indicative of sparsity of the input field comprises a basis in which said input field is sparse.

39. A system according to claim 31, wherein the input field is sparse in a domain connected to Fourier domain by linear or non-linear transformation, the processor utility being configured and operable to perforin said linear or non-linear transformation.

40. A system according to claim 31, wherein the input field is sparse in real space measured in a Fourier domain.

41. A system according to claim 31, wherein the input field is sparse in a second derivative domain measured either in Fourier domain or in real space domain.

42. A system according to claim 31, wherein said data indicative of sparsity of the input field has a matrix representation of the basis in which said signal is sparse.

43. A system according to claim 31, wherein said processor is configured for determining the sparse vector by applying to the output field non-local hard thresholding, said non-local hard thresholding comprises allocating off-support elements of the sparse vector, said allocating comprising zeroing out each element of the sparse vector which is below a fixed threshold along with its neighbors.

44. A system according to claim 31, wherein said input field correspond to an optical input field or an electronic input field.

45. A system according to claim 44, wherein the input field comprises one or more pulses, the reconstructed field has substantially the same profile as that of each of said one or more pulses.

46. A system according to claim 31, wherein said processor utility in configured for carrying out initial decoding of the received measured data.

47. A system according to claim 46, wherein the measurement system comprises a coder utility for coding the input signal.

48. A system according to claim 44, wherein the measurement system comprises a detection unit including at least one of the following signal detectors: oscilloscope, photodiode, streak camera, frequency resolved optical gating (FROG), Spectral Interferometer for Direct E-field Reconstruction (SPIDER), Cross-correlation Frequency resolved optical gating (XFROG), GRENOUILLE, and TADPOLE.

49. A system according to claim 44, wherein the measurement system is configured for carrying out at least one of the following: cross correlation of an input signal with a reference signal, the input field being a result of said cross correlation; and auto correlation of an input signal with itself, the input field being a result of said autocorrelation.

50. A system for reconstructing an input field sensed by a measurement system, the system comprising: at least one input port for receiving measured data corresponding to output field of certain measurement system, and for receiving data about sparsity of the input field, and data about effective response function of the measurement system; and a data processor utility for processing the measured data based on said data about the sparsity and about the effective response function to reconstruct the input field with resolution above an effective cutoff of said effective response function.

51. A measurement system comprising: an imaging system defining an input field propagation to an optical detector, and a control unit having a processor utility for processing measured data output from said detector, the processor utility being configured and operable for processing the measured data based on data about sparsity of the input field and data about an effective response function of the imaging system to reconstruct the input field with resolution above an effective cutoff of said effective response function.

52. A measurement system according to claim 51 wherein said imaging system is configured for far field imaging of the input field.

53. A measurement system comprising: a detector having a certain temporal response function defined by an effective cutoff frequency thereof and being configured and operable for receiving an input field in the form of one or more pulses and generating measured data indicative thereof; and a control unit having a processor utility for processing the measured data, the processor utility being configured and operable for processing the measured data based on data about sparsity of the input field and data about said temporal response function to reconstruct the input field with resolution above said effective cutoff of said temporal response function, thereby enabling reconstruction of a relatively short pulse by a relatively slow detector.

54. A measurement system according to claim 53, wherein the detector including at least one of the following signal detectors: oscilloscope, photodiode, streak camera, frequency resolved optical gating (FROG), Spectral Interferometer for Direct E-field Reconstruction (SPIDER), Cross-correlation Frequency resolved optical gating (XFROG), GRENOUILLE, and TADPOLE.

55. A measurement system according to claim 53, configured for carrying out at least one of the following: cross correlation of an input signal with a reference signal, the input field being a result of said cross correlation; and auto correlation of an input signal with itself, the input field being a result of said autocorrelation.

\* \* \* \* \*